Feb. 5, 1957 R. N. FLECK 2,780,526
ISOTOPE SEPARATION PROCESS
Filed April 12, 1951 5 Sheets-Sheet 1

INVENTOR.
RAYMOND N. FLECK,
Ross J. Garofalo
ATTORNEY.

INVENTOR.
RAYMOND N. FLECK,
BY Ross J. Garofalo
ATTORNEY.

Feb. 5, 1957

R. N. FLECK 2,780,526

ISOTOPE SEPARATION PROCESS

Filed April 12, 1951

INVENTOR
RAYMOND N. FLECK,
By
Ross J. Garofalo
ATTORNEY.

Feb. 5, 1957 R. N. FLECK 2,780,526
ISOTOPE SEPARATION PROCESS
Filed April 12, 1951 5 Sheets-Sheet 5

INVENTOR.
RAYMOND N. FLECK,
BY
Ross J. Garofalo
ATTORNEY.

United States Patent Office 2,780,526
Patented Feb. 5, 1957

2,780,526

ISOTOPE SEPARATION PROCESS

Raymond N. Fleck, Long Beach, Calif., assignor to Union Oil Company of California, Los Angeles, Calif., a corporation of California Application April 12, 1951, Serial No. 220,688

33 Claims. (Cl. 23—151)

This invention relates generally to the separation of mixtures of isotopes by selective adsorption. More particularly this invention relates to a process for separating a chemical compound into species of that compound differing in their isotopic makeup by a selective adsorption process employing a substantially compact moving bed of granular adsorbent.

The advent of atomic energy processes on a commercial scale has created, and will in the future continue to create, large demands for relatively pure single isotopes. Many methods have been proposed and employed in the prior art for the separation of isotopic mixtures and/or enrichment thereof. Such processes include fractional distillation, gaseous diffusion, electromagnetic methods, mass spectrographic methods, chemical isotopic exchange reactions, selective electrolysis, and the like. These processes are generally very expensive in commercial operations and require large and expensive outlays of equipment. The separation factors for most of the existing processes are very low, even for the hydrogen isotopes, and a great number of theoretical stages must be employed to achieve significant separations. Furthermore the separation or enrichment of isotopes by the foregoing methods usually involves a large hold-up of materials within the process.

It has now been found that isotopes may be separated by selective adsorption on a moving bed of a granular adsorbent such as silica gel, alumina, silica-alumina gels, magnesia, charcoal and the like. In one modification of the process a chemical compound consisting of a plurality of atoms is subjected to counter-current treatment with the moving bed adsorbent in an adsorption zone wherein that species of the compound containing the higher atomic weight isotope or isotopes is selectively adsorbed on the adsorbent. The adsorbent containing the adsorbed heavier isotopes is then subjected to rectification in a selective rectification zone so as to preferentially desorb residual lower atomic weight isotope containing compounds therefrom and finally the enriched heavy isotope is recovered by a final desorption step. In another modification of the invention the adsorption and/or desorption is, or are, carried out in the presence of added "third components" which alter the relative adsorbability of the several isotope containing species of the compound. In another modification of the invention an enriched fraction is withdrawn, subjected to isotopic exchange conditions, and the product therefrom is returned to a selective adsorption process for further enrichment.

Several systems can be employed for designating isotopic species. The most prevalent is that of employing the chemical symbol to designate the element, superscripts to designate the atomic weight of the atom and subscripts for the number of atoms in the molecule. Light and heavy hydrogen may be distinguished by the separate chemical symbols H and D, or by the separate names protium and deuterium, or by the more systematic symbols $H^1$ and $H^2$. Light and heavy hydrogen molecules are written as $H_2^1$ and $H_2^2$ respectively while light-heavy hydrogen gas is written as $H^1H^2$ or HD.

Isotope exchange can take place, either in the presence or absence of catalysts, between isotopic species of the same chemical compound or between isotopic species of two different compounds. In order to simplify the discussion of these processes an isotope exchange between two species of the same compound will be designated as "homo-molecular" as in the following molecular hydrogen exchange:

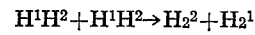
$$H^1H^2 + H^1H^2 \rightarrow H_2^2 + H_2^1$$

The isotope exchange between two different compounds will be designated as "hetero-molecular" as in the following typical exchange between molecular hydrogen and water:

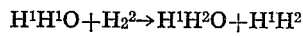
$$H^1H^1O + H_2^2 \rightarrow H^1H^2O + H^1H^2$$

The expression "third component" is employed throughout this disclosure and in the following claims to describe a group of compounds which alter the relative adsorbability of two compounds or two species of the same compound, i. e., binary mixtures. Such components may be employed in the separation of ternary, quaternary, and higher mixtures but at a given point in the column the separation being effected is between one part of the mixture and a second part of the mixture. In the latter case the 'third component" alters the relative adsorbability of the one part compared to the other.

The term "isotopic species" in reference to a single molecule designates a single species or a mixture of species of a single molecular structure which differ in isotopic content but not in chemical structure. Thus $H_2^1$, $H_2^2$, and $H^1H^2$ are each an isotopic species of a single molecule, i. e. $H_2$. Thus ordinary hydrogen gas is a mixture of isotopic species of the molecule $H_2$. The expression $H^xH^yO^z$ represents the isotopic species of water $H_2O$ where $x$ may be 1 or 2, $y$ may be 1 or 2, and $z$ may be 16, 17 or 18.

It is therefore an object of this invention to separate and/or enrich isotopes by selective adsorption on a moving bed of granular adsorbent with a minimum process holdup.

It is another object of this invention to subject substantially pure chemical compounds to selective adsorption so as to separate the chemical compound into two or more species of that compound differentiated by their respective isotope content.

It is another object of this invention to separate partially enriched fractions by selective adsorption, effect a homo-molecular isotope exchange within such partially enriched fractions, and to separate further enriched fractions from the products of the isotope exchange by further selective adsorption or by other process.

It is another object of this invention to strip charcoal containing an adsorbed isotope with a relatively leaner mixture of the same compound and to return the stripped fraction to the moving bed of adsorbent.

It is another object of this invention to cause the simultaneous homo-molecular and/or hetero-molecular isotope exchange and selective adsorption to occur in a moving bed of granular adsorbent thereby permitting substantially pure isotopic recovery of a chemical species not present originally in the feed stock.

It is another object of this invention to separate steam into substantially pure protium oxide and deuterium oxide by selective adsorption in a moving bed of granular adsorbent.

It is another object of this invention to separate substantially pure protium and deuterium by the selective adsorption of hydrogen gas in a moving bed of granular adsorbent.

It is another object of this invention to subject single chemical compounds to selective adsorption at temperatures relatively near the boiling point of the particular compound in order to separate the compound into two or more isotopically enriched species of that compound.

It is another object of this invention to subject steam to selective adsorption to produce a partially enriched deuterium fraction and to subject the partially enriched deuterium fraction to fractional electrolysis to further enrich the fraction and to produce substantially pure deuterium oxide thereby.

It is another object of this invention to subject steam to selective adsorption to produce a partially enriched deuterium oxide containing fraction, in the presence of hydrogen gas, so that simultaneous selective adsorption and hetero-molecular isotope exchange takes place.

It is another object of this invention to separate either two or more chemical compounds, or two or more isotopic species of a single compound possessing similar relative adsorbabilities by introducing a third component into the adsorption and/or rectification zones which third compound possesses the character of altering the relative adsorbability of such two compounds or such two species of a compound.

It is another object of this invention to subject steam to a moving granular bed of a hydrate-forming material which is selectively hydrated by deuterium oxide and/or deuterium hydroxide.

Other objects and advantages of this invention will become apparent to those skilled in the art as the description thereof proceeds.

Briefly this invention relates to a method of isotope enrichment wherein the isotopic mixture is subjected to selective adsorption and selective desorption in a substantially compact moving bed of solid granular adsorbent. The process is characterized generally by an adsorption zone wherein the heavier isotope is selectively adsorbed on relatively cooled adsorbent and a rectification zone wherein any residual lighter isotope is selectively desorbed by a rich reflux gas containing the heavier isotope. The purified heavier isotope is removed from the rectified adsorbent produced in the rectification zone by desorption by heating or by stripping with a more readily adsorbable compound in a desorption zone.

In one modification of the invention the isotope separation is effected by the difference in the relative adsorbabilities of the lighter isotope relative to the heavier isotope. Thus light helium $He^3$ may be separated from heavy helium $He^4$ by selective adsorption of the heavy helium in a moving bed of adsorbent according to the process of this invention. Similarly light and heavy hydrogen, $H^1$ and $H^2$, can be separated by selective adsorption of hydrofluoric acid HF since fluorine has a single isotopic species and $H^2F$ is more readily adsorbable than $H^1F$.

In the vast majority of cases however, simple selective adsorption is inadequate for the separation of isotopes. Most elements consist of a series of two or more isotopes and most molecular structures are polyatomic and contain two or more atoms, each atom occurring in isotopic modifications. Simple selective adsorption of such systems will not yield pure isotopes in the absence of isotope exchange. $H^2H^2O^{16}$, $H^1H^2O^{17}$, and $H^1H^1O^{18}$ are practically inseparable by selective adsorption owing to the identity of their molecular weights and the great physical and chemical similarity of the three isotopic species of a single molecular structure, viz. $H_2O$. In the process of this invention such a mixture is isotopically shifted to form $H^2H^2O^{18}$ and $H^1H^1O^{16}$ both of which are separated and the residual mixture from the separation is again, or is repeatedly, subjected to isotopic shifting. By this means $O^{16}$, $O^{17}$, $O^{18}$, $H^1$ and $H^2$ can be recovered in isotopically pure form. Analogously pure $H^1$ and $H^2$ can be recovered in the form of $H_2^1$ and $H_2^2$ from hydrogen deuteride $H^1H^2$.

It has been found that the preferred selective adsorption temperature is close to the boiling point of the compound being fractionated since the greatest difference between relative adsorbabilities is obtained at lower temperatures and particularly at temperatures somewhat below the normal boiling point of the compound being fractionated.

At the low temperatures necessary for the selective adsorption of many low boiling compounds the isotopic shift can be made to take place on the surface of a suitable catalyst. Such catalysts as metal oxides and sulfides may be impregnated on ordinary adsorbents such as alumina, silica gel, charcoal and the like. $H_2$, $H_2O$, $H_2S$, and $H_2Se$ are examples of compounds which can be shifted in the presence of a catalyst at low temperatures.

In other cases the exchange reaction does not take place at reasonable rates at low temperatures even in the presence of catalyst. Nitrogen, oxygen, ammonia, and methane are examples of such compounds. In these cases the feed is partially enriched by fractionation of the existing species and the enriched fraction is withdrawn, subjected to an isotopic exchange at suitably high temperatures such as 200° F. to 1200° F. and the equilibrated mixture, or partially equilibrated mixture, is again selectively adsorbed to separate the new molecular species synthesized during the isotope exchange.

A particular feature of the process, therefore, resides in effecting isotope exchange between the several isotopic species of a single polyatomic molecule to be separated. In the case of ordinary water at room temperature about 99.7% of the deuterium present therein exists in the form of deuterium hydroxide DOH ($H^1H^2O$) and only about 0.3% in the form of deuterium oxide $D_2O$ ($H_2^2O$). Protium oxide ($H_2^1O$) constitutes about 99.98% of ordinary water. It is apparent that the separation of pure deuterium oxide from such mixtures requires an isotope shift to take place at an appreciable reaction rate. Such isotope exchange occurs within the adsorbed phase on the adsorbent. By the use of certain catalysts this exchange can be made to take place at a rate which permits a rapid throughput of materials. Cationic and anionic exchange resins promote isotope exchange in the selective adsorption of steam as do certain metal oxides and sulfides. These solid substances are conveniently added to the circulating adsorbent bed, and in the case of metal oxides and sulfides these may be supported on the adsorbent. When the process of this invention is employed for the isotopic separation of steam, deuterium hydroxide and the trace of deuterium oxide are selectively adsorbed in the adsorption zone, and in the rectification zone an isotope exchange occurs between molecules of the deuterium hydroxide which produces protium oxide (normal water) and deuterium oxide. The protium oxide is then selectively desorbed leaving substantially pure deuterium oxide on the solid adsorbent.

In certain cases it is preferable to separate enriched deuterium fractions such as $H^1H^2O$ and to complete the final enrichment of this mixture containing varying amounts of $H_2^1O$ and $H_2^2O$ by means of electrolysis. The enrichment per stage by electrolysis is very high but the very low concentration of deuterium in naturally occurring water necessitates much electrolysis, combustion and re-electrolysis to effect a satisfactory separation. The use of electrolytic feed water containing a ratio of $H^2/H^1$ of only 10/90 represents a great decrease in the electrical energy required to produce 99% deuterium oxide. Such concentrates can be satisfactorily produced under conditions which effect little or no isotope exchange. Usually the electrolytic feed water will contain more than about 5% of hydrogen in the form of deuterium.

The hydrogen produced by electrolysis contains relatively less $H^2$ than the electrolyte but the deuterium content renders it too valuable to discard. Such hydrogen may itself be selectively adsorbed to eliminate the $H_2^1$ and/or $H^1H^2$. Alternatively, the deuterium content may be employed in a hetero-molecular isotope shift in, or outside of, the selective adsorption column for concentrating $H^1H^2O$ and $H_2{}^2O$ according to the following types of equations:

$$H^1H^2 + H_2{}^1O \rightarrow H_2{}^1 + H^1H^2O$$

$$H_2{}^2 + H_2{}^1O \rightarrow H_2{}^1 + H_2{}^2O$$

$$H_2{}^2 + H^1H^2O \rightarrow H^1H^2 + H_2{}^2O$$

The adsorbabilities of different isotopic species are usually very close, particularly for the isotopes of the elements having high atomic weights. In these cases it is often desirable to introduce a third component into the adsorption and/or rectification zones which alters and decreases the adsorbability of the lighter isotope or isotopes relative to the heavier isotope or isotopes. Such third component compounds may themselves possess relative adsorbabilities which are either greater or less than the adsorbability of the molecules whose isotopic species are being resolved. Where the third component is selectively adsorbed relative to the isotope containing compound to be separated, it is introduced into or above the adsorption zone and flows concurrently with the adsorbent downwardly through the adsorption and rectification zones. Where the third component compound is less readily adsorbable, it is introduced into or below the rectification zone and flows countercurrent to the descending adsorbent stream upwardly through the adsorption zone and is removed therefrom or thereabove.

Figure 3:
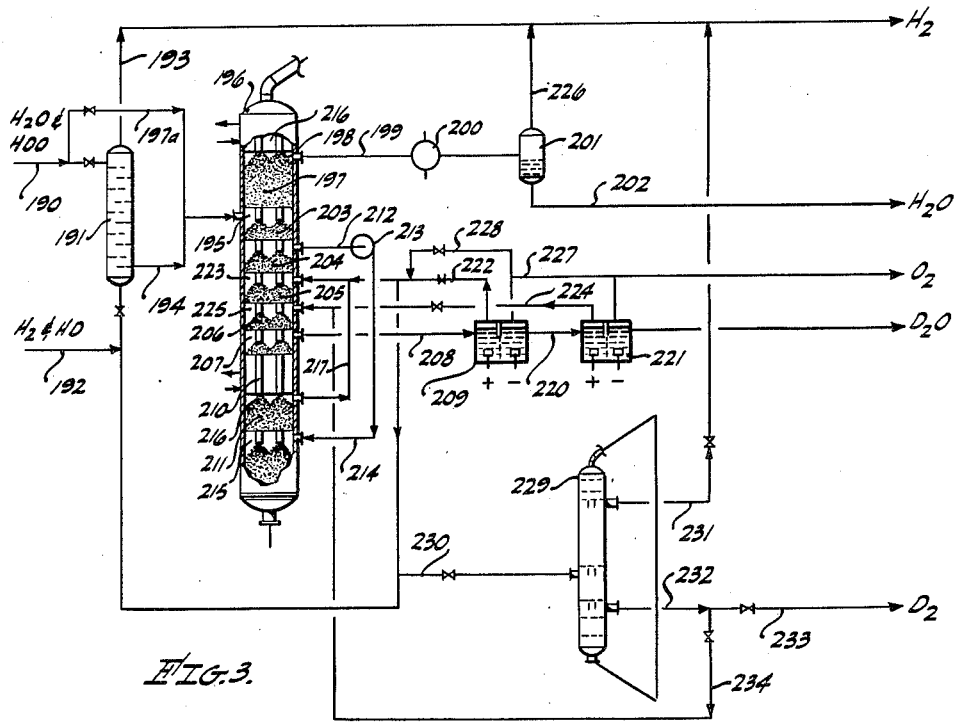

Figure 3 shows a modification of the invention which employs hetero-molecular isotopic exchange within the selective adsorption zones to increase the efficiency of the process. In particular, enriched deutreium oxide is subjected to fractional electrolysis and the evolved gases are returned to the adsorption column to undergo hetero-molecular isotopic exchange therein and permit recovery of the deuterium content thereof.

Figure 4:
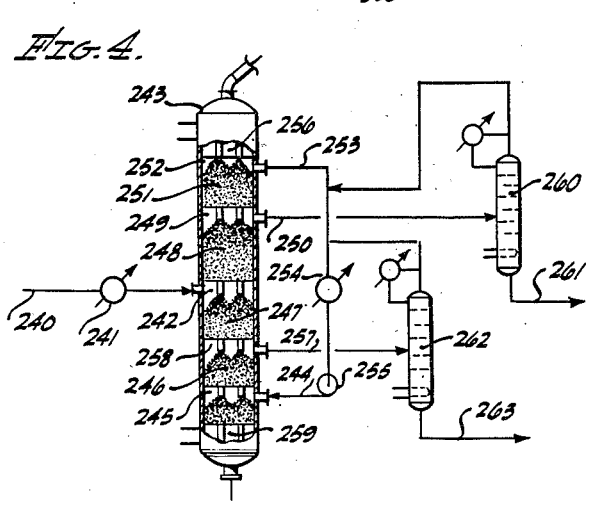

Figure 4 shows an arrangement for employing third components in a selective adsorption column wherein the third component is removed from the two product streams by fractional distillation.

Figure 5:
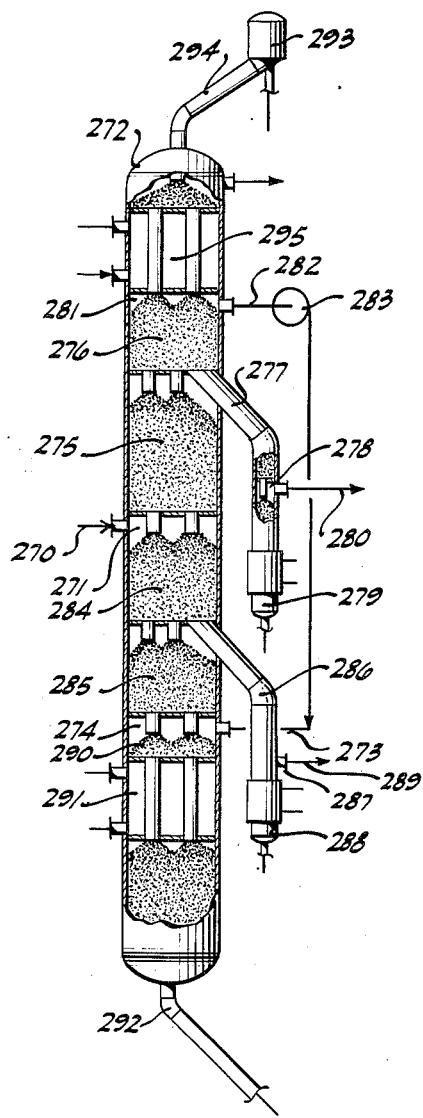

Figure 5 shows an alternative arrangement for employing a third component in the adsorption and rectification zones wherein selective adsorption is employed to remove the products from the column without simultaneously removing the less readily adsorbable third components.

Figure 6:
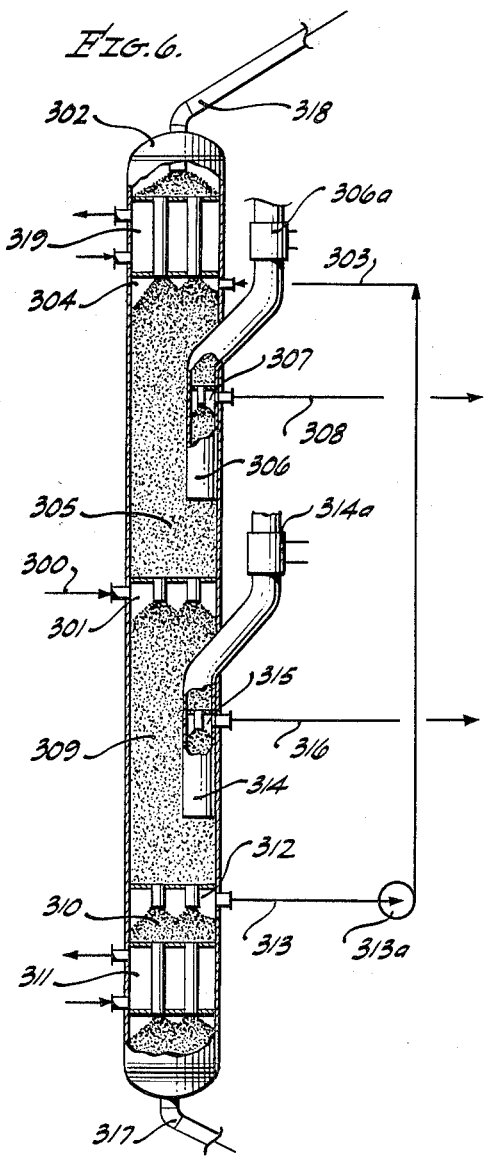

Figure 6 presents a modification of Figure 5 wherein the third component is more readily adsorbable than the compound whose isotopic species are being resolved.

Figure 7:
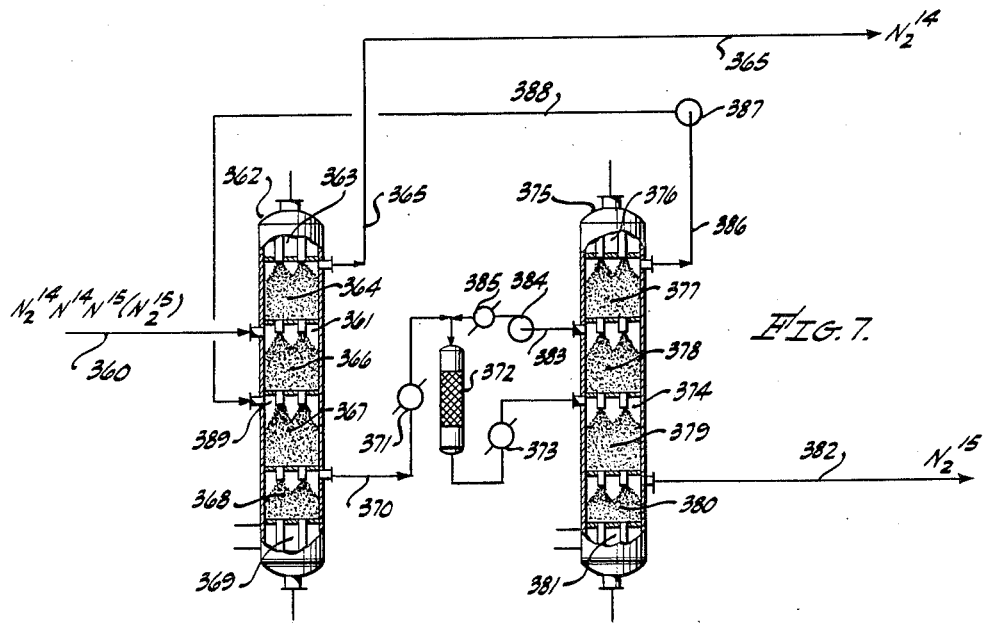

Figure 7 presents a modification of the invention wherein homo-molecular isotope exchange is conducted on mixed isotope molecules to produce an equilibrium isotope distribution between the molecules which is subsequently subjected to purification in an auxiliary column.

Figures 8, 9:
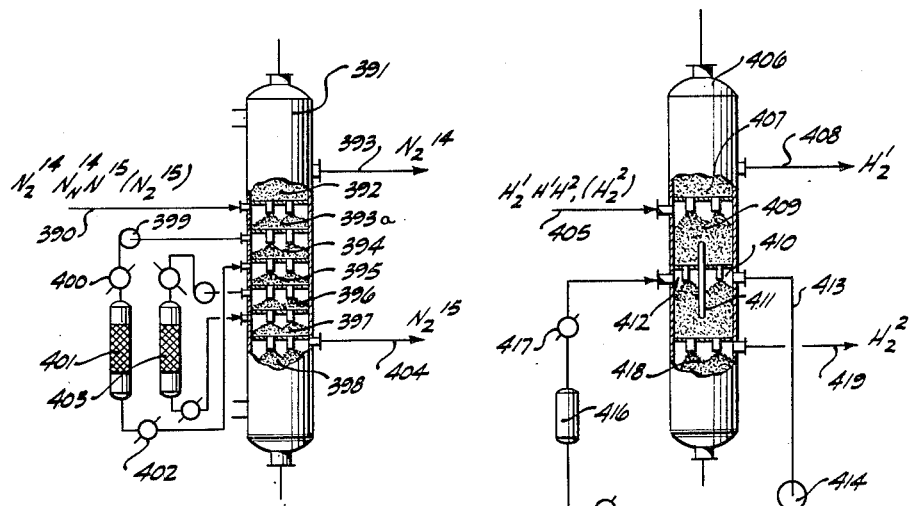

Figure 8 shows a modification of the invention wherein homo-molecular isotope exchange is conducted externally to the selective adsorption column.

Figure 9 shows an alternative modification for externally equilibrating a mixed isotope molecule containing fraction.

Figure 10:
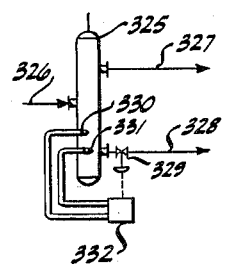

Figure 10 shows a modification of the invention for controlling product withdrawal by means of differential thermal conductivity measurements.

Figure 11:
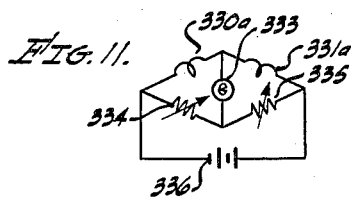

Figure 11 shows an electrical circuit for detecting differential thermal conductivity measurements.

Figures 1, 1A:
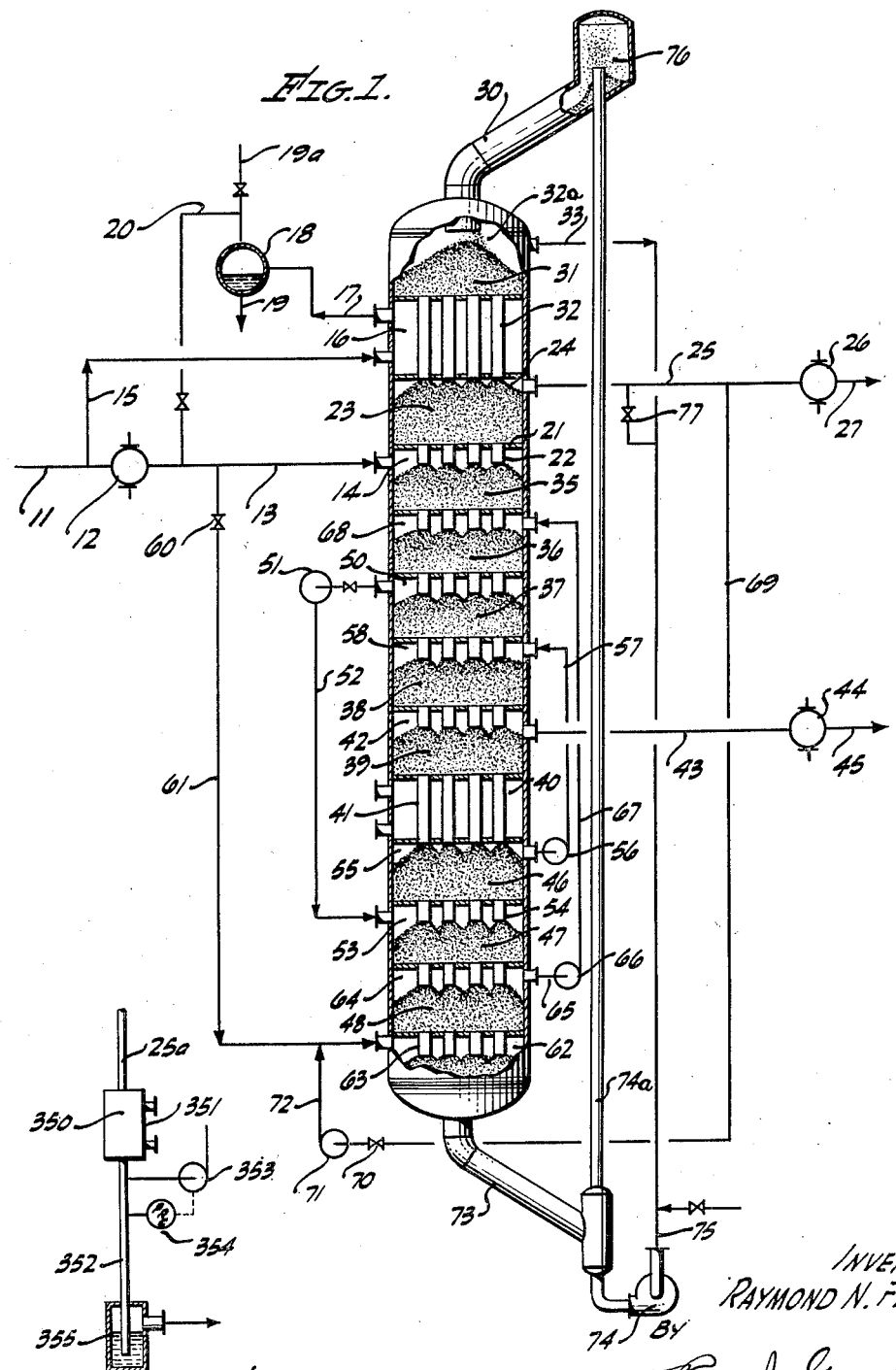
Figure 1 represents one modification of the invention wherein a chemical compound may be resolved into two or more isotopic species. Steam may be separated into deuterium oxide and protium oxide in this manner.
Figure 1a shows a modification of the invention for employment with the apparatus of Figure 1 wherein the product streams are utilized to create and maintain a subatmospheric pressure within the column.

Referring now more particularly to Figure 1, the feed gas consisting of a plurality of istopic species of a chemical compound is introduced through line 11. In the ensuing discussion the separation of water will be described as one particular isotopic mixture which may be resolved by this process.

Feed water flowing in line 11 passes through interchanger 12 wherein it is vaporized to form steam and passes thence through line 13 into feed gas engaging zone 14. Alternatively, water in line 11 passes into line 15 and flows as a cooling medium to cooling zone 16 wherein it is vaporized to form steam and cools the recirculating adsorbent stream. Water and steam is discharged through line 17 into steam drum 18 wherein water containing salts, etc., collects in the bottom and is discharged through line 19. Steam in the upper part of steam drum 18 is removed through line 20 and passes to line 13 and thence to feed gas engaging zone 14. Excess steam is discharged through line 19a.

Feed gas engaging zone 14 comprises a transverse plate 21 which is fitted with a series of downcomers 22 which permit downflow of granular adsorbent therethrough and upflow of gases therethrough. The extension of downcomers 22 below transverse plate 21 forms a vapor space which makes up feed gas engaging zone 14.

Gas from feed engaging zone 14 flows upwardly from downcomers 22 against descending solid granular adsorbent and flows countercurrently through adsorption zone 23. In adsorption zone 23 deuterium hydroxide and minor amounts of deuterium oxide are selectively adsorbed on the countercurrently moving adsorbent and pass downwardly thereon as an adsorbed phase. Unadsorbed protium oxide passes upwardly into overhead product disengaging zone 24 and is withdrawn through line 25 whence it flows through interchanger 26 and line 27 to protium oxide production storage, not shown.

In the case of hydrogen isotope separations the overhead less readily adsorbable protium oxide or protium stream has substantially the same flow rate as the feed stock stream. Accordingly, interchangers 12 and 26 may be a single interchanger so that the overhead product stream heats and vaporizes the incoming feed.

Granular adsorbent passing through transfer line 30 flows downwardly into accumulation zone 31 wherein conveyance gas is separated from the adsorbent in separating zone 32a and is withdrawn through line 33. Adsorbent from accumulation zone 31 passes downwardly through tubes 32 which traverse cooling zone 16. The solid granular adsorbent is cooled to the desired adsorption temperature thereby and the cooled adsorbent flows downwardly through adsorption zone 23.

In adsorption zone 23 the granular adsorbent adsorbs principally deuterium hydroxide and minor amounts of deuterium oxide. The adsorbent containing principally adsorbed deuterium hydroxide passes downwardly through downcomers 22 into primary rectification zone 35 wherein a partial reaction occurs according to the equation:

$$2DOH \rightarrow D_2O + H_2O$$

The protium oxide formed thereby is selectively desorbed from the descending adsorbent and passes upwardly through downcomers 22 and adsorption zone 23.

In like manner adsorbent containing adsorbed deuterium hydroxide passes downwardly successively through secondary rectification zone 36, tertiary rectification zone 37, quaternary rectification zone 38 and thence into desorption zone 39. In each of the successive rectification zones 36, 37 and 38 the deuterium hydroxide shift occurs with the resultant formation of protium oxide which because of its lesser adsorbability passes upwardly through the successive zones. Rectified adsorbent passing downwardly from desorption zone 39 flows through heating zone 40 which is formed by tubes 41 being enclosed with a hot heat transfer agent. Adsorbent flowing through heating zone 40 within tubes 41 is heated to a temperature sufficient to desorb substantially all of the deuterium oxide and the minor amounts of deuterium hydroxide contained thereon. The hot vapors flow upwardly through desorption zone 39 and desorb gases from the adsorbent therein. Hot unadsorbed gases flow upwardly through the successive rectification zones 38, 37 and 36 as rich reflux gas wherein the deuterium oxide and deuterium hydroxide are selectively adsorbed and displace selectively any residual protium oxide thereby forming a rectified adsorbent. Simultaneously the deuterium hydroxide shift occurs in each of the zones with progressive increases in the deuterium content due to the catalytic action of the adsorbent on the reaction.

Accordingly substantially pure deuterium oxide is withdrawn from second product disengaging zone 42 through line 43 whence it flows through interchanger 44 and line 45 to deuterium oxide product storage, not shown.

Descending adsorbent from heating zone 40 is mixed with some deuterium oxide vapor. Small amounts of deuterium remain on the adsorbent through deuteration of any residual hydroxyl groups present in the adsorbent surface itself. The heated adsorbent then flows through first stripping zone 46, a sealing zone 47 and a second stripping zone 48. Stripping gas is withdrawn from stripping gas disengaging zone 50 immediately above tertiary rectification zone 37 and passes through blower 51 and line 52 into first stripping gas engaging zone 53. A suitable differential pressure control is employed to maintain substantially zero gas flow between zones 39 and 46 to prevent contamination of the product with stripping gas. Such control could operate to throttle the withdrawal of stripping gas in line 57. The stripping gas obtained thereby has been partially enriched with respect to deuterium content but is lean with respect to the deuterium content of the adsorbent to be stripped. Stripping gas from first stripping gas engaging zone 53 flows upwardly through downcomers 54 into first stripping zone 46. The action of the stripping gas removes the deuterium oxide containing gas in part and partially deuterates the adsorbent by protium exchange with deuterated hydroxyl groups. The stripping gas as a result of the stripping is partially enriched with deuterium and is withdrawn from stripping gas disengaging zone 55 whence it flows through blower 56 and line 57. Gas flowing in line 57 is returned through stripping gas engaging zone 58 which is below tertiary rectification zone 37. The stripping gas because of its increased deuterium content is returned to the column at a point below the point of withdrawal.

Adsorbent in contact with first stripping gas engaging zone 53 passes through sealing zone 47 and thence into second stripping zone 48. Feed gas is withdrawn from line 13 by control of valve 60 and passes through line 61 into second stripping gas engaging zone 62 whence it passes upwardly through downcomers 63 and through second stripping zone 48 wherein residual deuterium oxide both adsorbed and unadsorbed and deuterated hydroxyl groups are stripped of their deuterium content. Stripping gas from second stripping zone 48 is partially enriched in deuterium content thereby and is withdrawn from second stripping gas disengaging zone 64 through line 65, blower 66 and line 67 whence it passes into engaging zone 68. The composition of the stripping gas in this instance is that of the feed stock and the enriched stripping gas is introduced below the feed tray.

In the modification of stripping just described the feed gas was employed in the second stripping zone. This results in a partial contamination of the protium oxide stream in line 27 with some deuterium, because of the fact that the adsorbent so stripped with deuterium containing gas is subsequently conveyed to the top of the column and passes through disengaging zone 24. In certain cases it is desired to produce substantially completely dedeuterated protium oxide which may be used as a negative type tracer. Thus in large scale agricultural tests the assimilation of surface waters by plant life may be studied by watering such plants with dedeuterated water (protium oxide) such as is produced in large quantity by the process of this invention. The water so assimilated may be studied by following deuterium pick-up within the plants, viz, concentration changes of the deuterium content of the plant fluids.

Where substantially pure protium oxide is desired, stripping gas is withdrawn from line 25 through line 69 whence it flows through valve 70, blower 71 and line 72 into second stripping gas engaging zone 63. Under these conditions granular adsorbent leaving second stripping zone 48 is almost completely free of deuterium and such adsorbent will not subsequently contaminate the protium oxide stream in line 25.

Stripped adsorbent from second stripping zone 48 flows downwardly through conveyance line 73 and enters the lower portion of gas lift line 74a. Lifting gas enters blower 74 through line 75 wherein its pressure is increased and it is discharged into contact with stripped absorbent flowing in conveyance line 74a. The compressed gases pick up and suspend the solids and pass them upwardly through lift line 74a whence they pass into settling zone 76 wherein lifting gas separates from the suspended solids. The solid adsorbent slides down the bottom of the transfer line 30 into lifting gas disengaging separating zone 32a whence it is withdrawn through line 33. Lifting gas in line 33 is then passed to blower 74 for recycle.

In one modification of the invention protium oxide is employed as the lifting gas by opening valve 77 whence blower 74 takes suction on line 25. The use of protium oxide as the lifting gas minimizes the problems of contaminating the protium oxide stream with miscellaneous lifting gases.

The process of this invention may also be employed for the simultaneous recovery and/or enrichment of isotopes of two different elements. In the foregoing discussion in connection with Figure 1 the enrichment of deuterium was followed in detail. However simultaneously there occurred an enrichment of the oxygen isotope $O^{18}$ and partial enrichment of $O^{17}$. The oxygen isotopes undergo isotope exchange in a manner analogous to that described in connection with the hydrogen isotopes. The isotope exchange of oxygen atoms is accelerated by the presence of metal oxides and sulfides as in the case of hydrogen exchange.

The isotopic ratios for the two elements hydrogen and oxygen, as exist in nature, are as follows:

| Hydrogen | | Oxygen | |
|---|---|---|---|
| $H^1$ | 99.98 | $O^{16}$ | 99.757 |
| $H^2$ | 0.02 | $O^{17}$ | 0.039 |
| | | $O^{18}$ | 0.204 |

These data show that with complete isotope exchange and enrichment by selective adsorption that the recovery of substantially pure deuterium oxide will be accompanied by the simultaneous result that such oxygen will be the $O^{18}$ isotope. The recovery of less pure deuterium will be accompanied by increased recovery of the amount of $O^{18}$ and recovery of the $O^{17}$ oxygen isotopes.

While the separation of only hydrogen and oxygen isotopes has been described in connection with Figure 1, other isotopic systems may also be separated by the process of this invention such as hydrogen, helium, carbon monoxide, hydrogen cyanide, hydrogen sulfide, hydrogen selenide and the like.

While only two stripping zones have been described, it is apparent that a greater number may be employed to accomplish more complete stripping. Oxygen and hydrogen isotopes are particularly susceptible to isotope exchange with oxygen or hydrogen atoms on the adsorbent surface. Silica, alumina, zirconia, titania and mixtures thereof are particularly subject to such isotope exchange. This exchange can be lessened by exchanging H+ on the adsorbent with Na+, K+, Li+, Ba++, Al+++ and the like. Since the atoms are chemically bonded to the adsorbent, vacuum stripping, thermal desorption and the like are ineffective for their removal. In such cases it is desirable to employ two or more stripping zones wherein the adsorbent is contacted with lean vapors to replace heavier isotopes by exchange with the lighter isotopes. Charcoal is relatively less subject to either oxygen or hydrogen exchange and usually requires only one or two stripping zones.

For most isotope systems the separation factor between a given isotope pair is greater at temperatures near, and preferably below, the atmospheric boiling point of the liquid compound being separated and generally increased by operation at reduced pressures. Where the compound being fractionated by selective adsorption is a liquid boiling above about 100° F. and preferably above 150° F., the overhead product or the bottoms product may be employed to produce the vacuum by the method of Figure 1a.

Referring to Figure 1a the protium oxide vapor flowing in line 25 of Figure 1 may be passed through line 25a, jets 350 and an interchanger 351 to form liquid protium oxide. The condensed protium oxide is withdrawn through a barometric leg 352. An auxiliary vapor pump 353 actuated by a pressure recorder controller 354 on the vapor on the downstream side of the jets is intermittently or continuously operated to pump out non-condensible gases to prevent a pressure build-up within the column. The condensed protium oxide is withdrawn at atmospheric pressure from receiver 355. The cooling water for the interchanger 351 may be employed to heat the feed stock if desired. Similar vacuum producing equipment may be fitted to the deuterium oxide production line 43; the low flow rate of this stream makes this operation relatively unimportant however.

Because of the high value of the deuterium oxide, it is desirable to recover all of that which has been separated. Desorption under vacuum or low pressure stripping may be employed to improve the recovery. In one modification of Figure 1 rectification zone 38 may be replaced with a star feeder or other arrangement for transferring solids between two zones at different pressures. The use of jets and interchanger on line 43 produces a vacuum or low pressure zone in the column below the star feeder. In vacuum desorption no stripping gas is admitted to gas engaging zones 63 and 53. In low pressure stripping, valve 60 may be a pressure relief valve to admit a small intermittent or continuous stream of stripping gas to zone 63. A portion of the withdrawn vapors from line 43 are returned to the column as reflux by introduction above the star feeder. Line 73 may be of sufficient height to form a seal against the pressure, or alternatively line 73 may be fitted with a second star feeder to repressure the adsorbent into lift line 74a.

The apparatus of Figure 1 is adapted to process impure water. Where the mineral content of the feed water is very low, the feed may be passed into direct contact with a small portion of hot adsorbent to accomplish direct heat exchange therewith. The hot adsorbent and adsorbed and/or vaporized water is then passed into contact with cooled absorbent so that the final temperature of the resulting mixture is that of an adsorption zone.

In the operation of the apparatus of Figure 1, a greater adsorbent flow rate increases the ability of the column to perform a given separation. The product withdrawal is controlled to produce a given purity. The deuterium content for a given adsorbent flow rate is controlled by controlling the rate of withdrawal of product in line 45; a lower draw-off rate gives a higher product purity of the bottom product. Similarly the purity of the protium oxide stream is controlled by the rate of withdrawal in line 27. The feed rate is usually that required to maintain a given column presure, i. e., to make up for product withdrawal and losses. Conversely the feed rate may be maintained at some fixed value and the lean gas withdrawal controlled by a back pressure regulator.

An internal recirculation of reflux within zones 39 and 40 may be employed to improve desorption of the valuable heavy isotopes. A compound suitable for such refluxing is one which is more readily adsorbable than the compound containing the heavy isotope and can also be removed from the adsorbent by thermal desorption.

Referring again to Figure 1, circulating reflux is introduced into the column and passed to desorption zone 39. Adsorbed deuterium oxide passing downwardly into zone 39 is preferentially desorbed by this reflux and passed upwardly. Circulating reflux preferentially adsorbed in zone 39 passes downwardly into heating zone 40 on the adsorbent wherein it is desorbed by adsorbent heating and passes upwardly and is returned to zone 39.

While relative adsorbability cannot be predicted from boiling point date, generally speaking, the circulating reflux component will boil between about 0° and 150° F. above, and preferably between about 10° and 75° F. above, the boiling point of the compound to be refluxed, e. g., deuterium oxide. For this purpose either organic or inorganic volatile compounds of suitable adsorbability may be employed.

Compounds which may be employed as circulating reflux for deuterium oxide production include acetic acid, propionic acid, isobutyl alcohol, butyl alcohol, diethyl carbinol, secamyl alcohol, ethylene glycol monomethyl ether, cyclopentanol, piperidine, di-n-propyl amine, ethylene diamine, n-hexylamine, di-isobutyl amine, pyridine, alpha picoline, ethyl butyrate, sec-butyl acetate, n-butyl acetate, beta-chloroethyl ether, ethylene glycol, diethyl ether, isobutyl ether, n-amyl chloride, n-hexyl chloride, iso-amyl bromide, ortho fluoro-toluene, meta fluoro-toluene, para fluoro-toluene, chloro-benzene, ethylidene bromide, 1,1,2-trichlorethane, tetrachloroethylene, toluene, ethyl benzene, dimethyl cyclohexane, n-octane, methyl isobutyl ketone, di-isopropyl ketone, cyclopentanone, sec-amyl mercaptan, n-amylmercaptan, isobutyl nitrile, n-butyl nitrile, nitroethane, nitropropane, and the like.

Compounds which may be employed as circulating reflux for deuterium ($H_2^2$) or hydrogen deuteride ($H^1H^2$) production include $H_2S$, $NH_3$, $HCN$, $CO$, $CO_2$, $HCl$ and the like.

Compounds which may be employed as circulating reflux during the separation of $U^{235}F_6$ from $U^{238}F_6$ include volatilizable inorganic and organic fluorides such as fluoro-carbons.

The principles of selective adsorption and multiple isotope exchange are perhaps better illustrated by reference to the selective adsorption and isotope exchange of hydrogen cyanide. The naturally occurring isotope ratios of the component elements hydrogen, carbon and nitrogen are as follows:

| Hydrogen | | Carbon | | Nitrogen | |
|---|---|---|---|---|---|
| $H^1$ | 99.98 | $C^{12}$ | 98.9 | $N^{14}$ | 99.62 |
| $H^2$ | 0.02 | $C^{13}$ | 1.1 | $N^{15}$ | 0.38 |

The foregoing data show that the lighter isotope in the case of each element is by far the most plentiful and in each case constitutes more than 98.9% of the isotopic species. Where it is desired to recover the three heavier isotopes in the form of HCN, it is apparent that the heaviest species $H^2C^{13}N^{15}$ is extremely uncommon due to the remote possibility of the three minor constituents being simultaneously present in the same molecule. The vast majority of the HCN molecules are of the type $H^1C^{12}N^{14}$. The great majority of the $H^2$ atoms will occur in the molecule $H^2C^{12}N^{14}$. The great majority of the $C^{13}$ atoms will occur in the molecule $H^1C^{13}N^{14}$. The great majority of the $N^{15}$ atoms will occur in the molecule $H^1C^{12}N^{15}$.

By the principles of this invention the species $H^2C^{13}N^{15}$ is synthesized by selective adsorption and homomolecular isotope exchange and is recovered as such, although such molecule is extremely rare in the original mixture. The isotope ratios of carbon, hydrogen and nitrogen show a deficiency of $H^2$ atoms compared with $C^{13}$ and $N^{15}$ atoms. Accordingly the next most adsorbable constituent after $H^2C^{13}N^{15}$ will be $H^1C^{13}N^{15}$ until the nitrogen which is the next least plentiful component is entirely consumed after which $H^1C^{13}N^{14}$ will be most readily adsorbed with the ultimate production of the least adsorbable $H^1C^{12}N^{14}$.

Figure 2:
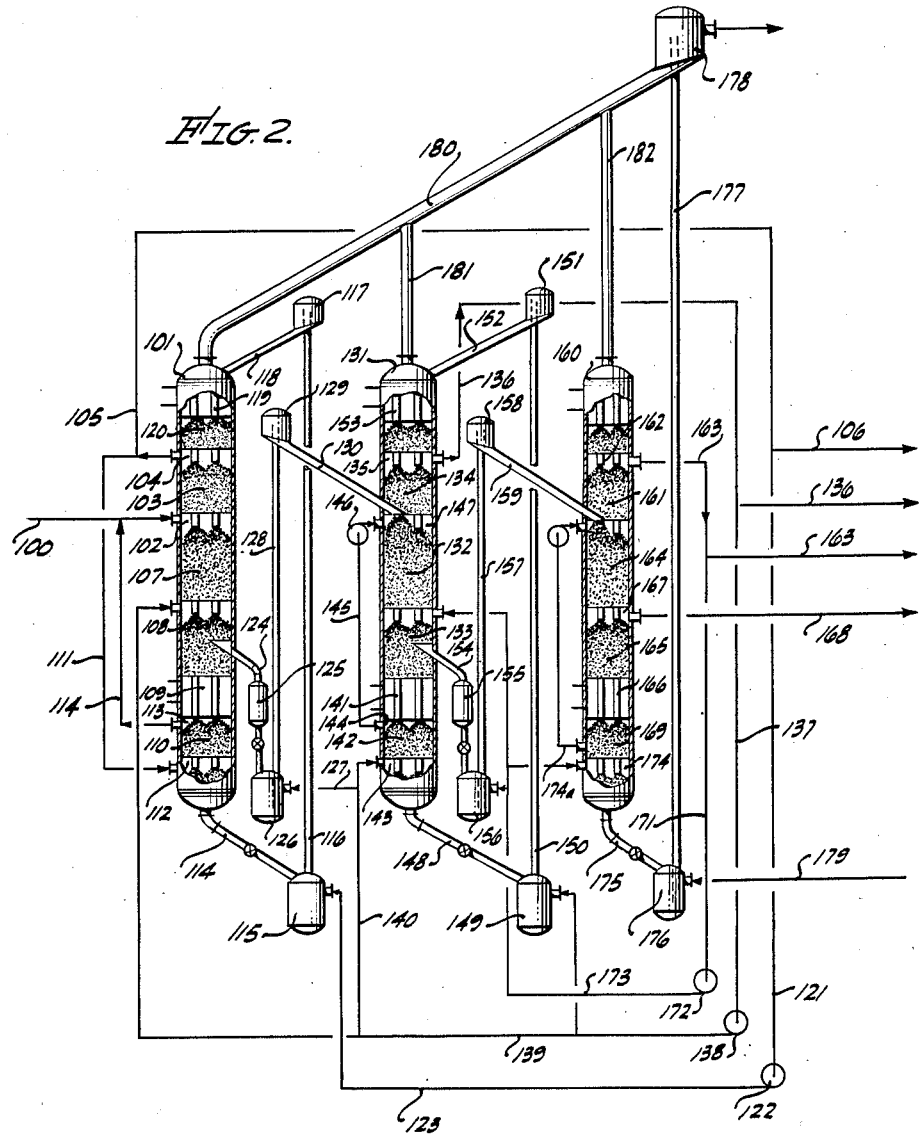
Figure 2 shows an alternative modification of the invention which is employed for the separation and purification of a plurality of isotopes. This form of the invention is particularly useful where it is desired to employ equipment of relatively limited height.

Perhaps the synthesis and fractionation of the species HCN are best illustrated by reference to Figure 2. Figure 2 presents one modification of apparatus for extensive selective adsorption and isotope exchange of isotope species. The apparatus possesses the particular advantage in that it employs a plurality of columns of low height and permits extensive rectification of each and all isotopic species produced therefrom.

Referring now more particularly to Figure 2, the feed stock, which is HCN for purposes of illustration, is introduced through line 100 whence it enters primary column 101 in feed engaging zone 102. The gases flow upwardly from feed engaging zone 102 through appropriate downcomers and through adsorption zone 103 wherein the least readily adsorbable $H^1C^{12}N^{14}$ passes through substantially unadsorbed and the HCN molecules containing one or more heavier isotopes are adsorbed on the downwardly moving bed of rich granular adsorbent. The non-adsorbed $H^1C^{12}N^{14}$ is withdrawn from product disengaging zone 104 through line 105 and is in part produced as a first product in line 106. The downwardly flowing adsorbent passes from adsorption zone 103 through rectification zones 107 and 108 wherein said least readily adsorbable $H^1C^{12}N^{14}$ is preferentially desorbed. Heating zone 109 serves to desorb adsorbed species from the downwardly flowing adsorbent therethrough and provides an upwardly flowing vapor stream of rich reflux gas in rectification zone 108 and 107 which serves to desorb selectively the lighter species and cause them to pass upwardly through adsorption zone 103. Homo-molecular exchange takes place to form the light $H^1C^{12}N^{14}$ which passes upwardly through the column. Adsorbent from heating zone 109 flows through stripping zone 110 wherein a portion of the overhead product in line 105 is passed through line 111 into stripping gas engaging zone 112 whence it flows through stripping zone 110 and removes molecules not desorbed by heating zone 109. Enriched stripping gas is withdrawn from stripping gas disengaging zone 113 through line 114 whence it is returned to the feed line 100.

Stripped adsorbent from stripping zone 110 passes through transfer line 114 to induction zone 115 wherein it is suspended or conveyed by means of a gas lift through lifting zone 116 to vessel 117 whence it passes with the gas through transfer line 118 and through cooling zone 119. Cooled adsorbent and lifting gas pass through accumulating zone 120 whence they flow to adsorption zone 103. In the preferred modification overhead lean product in line 106 is passed through line 121, blower 122 and line 123 whence they flow to lifting vessel 115 as lift gas. The lifting method is any suitable gas or mechanical lift which is employed in the art for these and similar purposes.

A particular feature of the particular apparatus lies in the fact that adsorbent containing adsorbed constituents is passed from one column to the next without necessity of desorbing the gases and consequent readsorption. Extensive stripping of such adsorbent is avoided.

A portion of the granular adsorbent from rectification zone 108 is withdrawn through line 124, heater 125 whence it flows to induction vessel 126. Heater 125 serves to heat partially the adsorbent and cause partial desorption of vapors for rich gas reflux where desired. Lifting gas is supplied to induction vessel 126 through line 127 and suspends or carries the solids through lifting zone 128 to vessel 129 and thence through line 130 whence they are discharged into second adsorption tower 131 partway down the column.

The vapors and adsorbent discharging from line 130 pass downwardly through rectification zone 132 and rectification zone 133. Homo-molecular isotope exchange takes place in these rectification zones. Vapors rising in the column as reflux cause the selective desorption of the least readily adsorbable constituent $H^1C^{13}N^{14}$ which passes upwardly through descending adsorbent in adsorption zone 134. In adsorption zone 134 components heavier than $H^1C^{13}N^{14}$ are adsorbed selectively and pass downwardly on the adsorbent. Unadsorbed $H^1C^{13}N^{14}$ is removed from column 131 from product disengaging zone 135 by line 136 whence it flows to product storage. A portion of the product in line 136 is withdrawn through line 137 whence it passes through blower 138 and line 139 and line 140 and is employed as lifting gas in lifting vessel 126 wherein the adsorbate is of somewhat similar composition.

In rectification zone 132 and rectification zone 133 the lighter overhead product is preferentially desorbed. A portion of the adsorbent in rectification zone 133 is withdrawn through heating zone 141 whence it flows through stripping zone 142. A portion of the column overhead product of column 131 is withdrawn through line 140 and introduced into stripping gas engaging zone 143 whence it flows through stripping zone 142 and is removed through stripping gas disengaging zone 144 by means of line 145. Enriched stripping gas in line 145 passes through blower 146 and is reintroduced in engaging zone 147 which is, or is near, the entry of line 130. Adsorbent from the bottom of tower 131 passes through line 148 to lifting vessel 149 whence it flows through lifting zone 150 to vessel 151 and thence through line 152 to the top of column 131. Lifting gas and adsorbent fall from line 152 through cooling zone 153 whence they join adsorption zone 134.

A portion of the adsorbent in rectification zone 133 is withdrawn through line 154, heater 155 and passes to induction vessel 156 whence it is conveyed through lifting zone 157, vessel 158, line 159, whence it enters column 160. The adsorbent in line 159 contains predominantly $H^1C^{13}N^{15}$ and $H^2C^{13}N^{15}$.

In column 160 rising reflux vapors cause preferential desorption of the least readily adsorbable $H^1C^{13}N^{15}$ which passes upwardly against descending fresh adsorbent in adsorption zone 161 to product disengaging zone 162 whence it is removed through line 163 and passes to product storage not shown. Descending adsorbent from lines 159 and adsorption zone 161 pass downwardly through rectification zone 164. In rectification zone 164 preferential desorption of any lighter $H^1C^{13}N^{15}$ occurs which component passes upwardly through adsorption zone 161. Adsorbent from rectification zone 164 passes downwardly through desorption zone 165 and heating zone 166. The heating causes the bulk of the remaining $H^2C^{13}N^{15}$ to be desorbed whence it is removed from product disengaging zone 167 through line 168 to product storage not shown.

Adsorbent from heating zone 166 passes through stripping zone 169 wherein a portion of the overhead product in line 163 passes through line 171, blower 172 and line 173 to stripping gas engaging zone 174. Enriched stripping gas from stripping zone 169 is withdrawn through line 174a and is reintroduced into the column 160. Stripped adsorbent is withdrawn in line 175 whence it flows to induction vessel 176 and is conveyed through conveyance zone 177 to vessel 178. Lifting gas for the final lifting from vessel 176 is supplied through line 179.

Adsorbent from vessel 178 is introducible into the first column 101 through line 180 and alternatively portions may be added to column 131 through line 181 and column 160 through line 182.

In the foregoing description of Figure 2, it is apparent that isotope exchange among the two isotopes of each of the three elements has taken place catalytically resulting in the formation of compounds not present in the original feed stock. It is also apparent that by means of a plurality of columns the use of a single extremely high column has been avoided. Furthermore, each of the individual isotopic species have been extensively rectified to separate very pure and highly isotope exchanged products. In each case the adsorbent is withdrawn from the preceding column containing adsorbed fractions and is passed as feed to the next succeeding column without necessity of desorption and readsorption. In the preferred modification such lifting is carried out by means of a gas lift with a gas composition approximating that of the gas in equilibrium with the adsorbent to be lifted. While the foregoing discussion has been limited to hydrogen cyanide as a feed stock gas, it is apparent that other polyatomic molecules behave similarly in the presence of a suitable isotope exchange catalyst-type adsorbent. About 0.3% by weight of platinum supported on alumina gel can be employed for catalyzing the HCN shift as a combination absorbent-catalyst for example.

In general, catalysts for the isotopic shifting of HCN are the metal oxides and sulfides described hereinafter.

The concentration of isotopes by means of selective adsorption may also be combined with isotope exchange with dissimilar molecules and with, or without, supplementary isotope enrichment processes. Figure 3 shows a modification of the invention for the selective adsorption of water in the presence of a hydrogen gas stream wherein deuterium is selectively removed from the hydrogen gas by the adsorbed water phase.

Referring now more particularly to Figure 3, ordinary water is introduced in line 190 and passes through countercurrent isotope exchange column 191. Hydrogen containing deuterium and/or hydrogen deuteride enters through line 192 and passes upwardly through isotope exchange column 191 and countercurrent to the descending water stream. Under these condiitons deuterium of the hydrogen gas is selectively removed by the water in the form of HDO and $D_2O$. Deuterium deficient hydrogen is removed from the top of the isotope exchange column through line 193. Water enriched by deuterium is removed from line 194 and after suitable vaporization passes to the feed gas engaging zone 195 of selective adsorption column 196. Alternatively, water may be by-passed around isotope exchange column 191 through line 197a by appropriate operation of valves. Water vapor in feed gas engaging zone 195 flows upwardly through downcomers into adsorption zone 197 wherein deuterium hydroxide HDO is selectively adsorbed in preference to the less readily adsorbable protium oxide $H_2O$. Protium oxide is removed from product disengaging zone 198 by line 199 whence it flows through interchanger 200 to separating vessel 201. Protium oxide in condensed form is withdrawn from vessel 201 and passes through line 202 to protium oxide storage.

Granular adsorbent containing adsorbed HDO and minor amounts of $D_2O$ and $H_2O$ flows downwardly through downcomers into a series of rectification zones 203, 204, 205 and 206. In the successive rectification zones upwardly flowing rich reflux gases cause preferential desorption of protium oxide. The increased concentrations of HDO in the lower portions of the column under the catalytic action of the adsorbent cause a deuterium hydroxide shift to occur resulting in the formation of deuterium oxide $D_2O$, and protium oxide $H_2O$. The deuterium oxide remains selectively adsorbed while the protium oxide is preferentially desorbed.

Enriched deuterium oxide is withdrawn from product disengaging zone 207 after desorption and flows through line 208 to primary electrolytic cell 209. Adsorbent from product disengaging zone 207 passes downwardly through heating zone 210 wherein deuterium oxide is desorbed and passes upwardly as rich reflux gas into rectification zone 207 wherein a somewhat less readily adsorbable mixture is preferentially desorbed. This gas passes in part into rectification zone 206 wherein a still less readily adsorbable mixture is preferentially desorbed and so on with rectification zones 205 and 204. In the rectification zones the deuterium oxide preferentially desorbs protium oxide and forms a rectified adsorbent.

Adsorbent from heating zone 210 passes through stripping zone 211. Partially enriched vapors are withdrawn from column 196 through line 212 whence they flow through blower 213 and line 214 to stripping gas engaging zone 215. The partially enriched stripping gas removes adsorbed and chemically bound deuterium from the adsorbent and the mixture is withdrawn from stripping gas disengaging zone 216 through line 217. Vapors in line 217 are reintroduced into the column at a point somewhat below the point of stripping gas removal. Stripped adsorbent from stripping zone 211 is withdrawn from the bottom of selective adsorption column 196 and is conveyed to the top of the column and reintroduced through cooling zone 216 which cools the adsorbent to a suitable adsorption temperature.

The enriched deuterium fractions in first electrolytic cell 209 are subjected to electrolysis which causes a hydrogen gas stream to be evolved which has a deuterium to protium ratio which is less than that present in the water being electrolyzed. The deuterium content of the gas is often one-third to one-eighth of that in the electrolytic bath. Similarly the oxygen evolved in the cell is relatively deficient in the heavier $O^{17}$ and $O^{18}$ oxygen isotopes. After a portion of the liquid is electrolyzed as by suitable continuous arrangement, residual water of first electrolytic cell 209 is passed through line 220 to second electrolytic cell 221 wherein the residual water is further enriched in its deuterium ratio. If desired, residual water may be still further enriched by selective electrolysis in still other cells not shown.

The evolved hydrogen from the primary cell is preferably passed through line 222 whence it flows into selective adsorption column 196 at first hydrogen gas engaging zone 223. Similarly hydrogen from second electrolytic cell 221 flows through line 224 to second hydrogen gas engaging zone 225 which is located somewhat below first hydrogen gas engaging zone 223. The hydrogen evolved from the electrolytic cells contains varying amounts of deuterium which it is desirable to recover. The hydrogen introduced into the two hydrogen gas engaging zones 223 and 225 passes upwardly through the colum and is withdrawn with the overhead product from product disengaging zone 198. During the course of its travel the hydrogen gas undergoes deuterium exchange with the adsorbed water vapor with the result that the deuterium is retained in the adsorbed water on the adsorbent surface and the protium is passed to the gas phase. The deuterium-deficient protium from the column is separated in vessel 201 and passes through overhead line 226 to product storage not shown. This hetero-molecular isotope exchange is catalyzed by metal oxides and metal sulfides.

In an alternative arrangement of the apparatus, oxygen gas rather than hydrogen gas may be returned to the column for isotope exchange. In this arrangement oxygen gas passes from the electrolytic cells through line 227 and 228 into the tray described previously for hydrogen gas engaging zone 223.

Alternatively, the hydrogen gas evolved from the electrolytic cells may be passed to a separate selective adsorption column 229 via line 230 by appropriate arrangement of valves. In selective adsorption column 229 the hydrogen gas passes upwardly through an adsorption zone wherein the more readily adsorbable HD and $D_2$ are selectively adsorbed and the less readily adsorbable $H_2$ passes upwardly and is removed from line 231. In the column the HD undergoes catalytic inter-molecular isotope exchange with other HD molecules to form less readily adsorbable protium oxide and more readily adsorbable deuterium. By this means substantially pure deuterium is produced from the rectification zone and is removed through line 232 and line 233 whence it flows to product storage. Alternatively, the deuterium gas or any degree of enriched deuterium in line 232 may be passed through line 234 and returned to a hydrogen gas engaging zone such as engaging zone 225 to undergo hereto-molecular isotope exchange with the adsorbed water in selective adsorption column 196.

It is apparent from the foregoing illustration of the invention that either homo-molecular isotope exchange or hetero-molecular isotope exchange may be carried out in a selective adsorption column in the presence of catalysts. Homo-molecular isotope exchange is typified by isotope exchange between two water molecules wherein either hydrogen or oxygen atoms are exchanged or by exchange between hydrogen molecules wherein a light hydrogen atom is exchanged for a heavy one. Hetero-molecular isotope exchange is typified by the exchange between water and hydrogen gas wherein a heavy hydrogen gas atom is exchanged for a light hydrogen atom in water.

Both homo-molecular and hetero-molecular isotope exchange processes may be carried out with other compounds than with water and/or hydrogen gas. The exchange between hydrogen cyanide previously described is of the homo-molecular type. The exchange between hydrogen gas and adsorbed hydrogen cyanide would represent a second type of hetero-molecular exchange.

In hetero-molecular exchanges a relatively more readily adsorbable compound is contacted with a relatively less readily adsorbable compound. Adsorbed water is contacted with hydrogen. The less readily adsorbable compound in this situation is in general an "isotopically exchangeable gas."

Another modification of the invention resides in the discovery that the relative adsorbability of two closely adsorbable compounds may be altered appreciably by conducting either the adsorption, or readsorption as in a rectification zone, or both, in the presence of an added third component. The third component is generally an organic or inorganic chemical compound which boils within about 150° F. and preferably within about 75° F. of the boiling point of one of the two or more compounds to be separated. Inorganic acids, ammonia, volatile inorganic oxides and the like may be employed as third components. Organic compounds such as organic acids, alcohols, ketones, ethers, aldehydes, esters, hydrocarbons such as paraffins, isoparaffins, olefins, acetylenes, naphthenes and aromatics and various sulfur and nitrogen-containing compounds may be employed for such purposes.

The closely related compounds whose separation is to be improved by the addition of a third component may be closely adsorbable isotopic species, closely adsorbable species of hydrocarbons, closely adsorbable optical isomers as in d, l-mixtures of optically active compounds for example.

As an example of the addition of third components to closely adsorbable mixtures, the separation of HDO from $H_2O$ as well as the separation of HDO from $D_2O$ are very difficult and require large amounts of adsorbent for the separations. Such separations may be considerably improved by the recirculation of a third component through the adsorption zone and/or the rectification zone.

Compounds which may be employed to improve the separation of the deuterium isotopes in water include methyl alcohol, ethyl alcohol, propyl alcohol, isopropyl alcohol, 4-methyl-2-pentanol, phenol, dimethyl ether, diethyl ether, methyl ethyl ether, dipropyl ether, diisopropyl ether, dioxane, ethylene glycol diethyl ether, ethylene glycol mono-methyl ether, acetone, methyl ethyl ketone, methyl propyl ketone, diethyl ketone, cyclopentanone, formaledhyde, acetaldehyde, propionaldehyde, benzene, toluene, xylene, cyclohexane, cyclohexene, methyl cyclopentane, cyclopentane, dimethyl cyclopentane, n-hexane, n-heptane, n-octane, 2-methyl hexane, pyridine, 2-methyl pyridine, 3-methyl pyridine, 4-methyl pyridine, 2-ethyl pyridine, dimethyl pyridines, furan, 2-methyl furan, hydrofuran, furfuryl alcohol, thiophene, methyl thiophene, ethyl thiophene, carbon dioxide, methyl mercaptan, ethyl mercaptan, dimethyl sulfide, diethyl sulfide, methyl amine, dimethyl amine, trimethyl amine, propyl amine, butyl amine, nitro-methane, nitro-ethane, 1-nitro-butane, methyl iodide, methyl chloride, methyl bromide, ethyl iodide, ethyl chloride, propyl fluoride, trichloro ethylene, propylene chloride, fluoro-benzene, chloro-benzene, acetonitrile, propionitrile, isobutyro nitrile, n-valero nitrile, methyl acetate, ethyl acetate, ethyl propionate, methyl n-butyrate, sec-butyl acetate, formic acid, acetic acid, propionic acid, butyric acid, N,N-dimethyl formamide, and the like.

Certain compounds such as amines, amides, alcohols, ketones, aldehydes, acetylenes, nitro-alkanes and the like undergo fairly rapid hydrogen exchange, particularly in the presence of acidic or basic substances on the adsorbent. Where the third component is more readily adsorbable than water and is of this class of compounds, it is preferable to contact the third component with successively more dilute heavy water in the adsorption column to prevent exchanged deuterium in the third component from rising to the top of the column. The equilibrated water can be returned to the column at the appropriate concentration level for recycling.

Where the readily deuteratable compound is less readily adsorbed than water, there exists some tendency to carry deuterium up the column. In these cases the carry-up of deuterium is preferably minimized by operating with highly purified adsorbents, i. e. substantially neutral, and by passing the third component only through the adsorption zone.

Ethers, thioethers, and esters are not subject to deuterium exchange and are generally preferable. No provision is required for dedeuteration of the third component in this case.

The separation of HD from either $H_2$ or $D_2$ may also be improved by the addition of third components. Suitable components for this separation include sulfur dioxide, hydrogen sulfide, ammonia, carbon dioxide, carbon monoxide, hydrogen cyanide, hydrochloric acid, methyl fluoride, methylene fluoride, fluoroform and the like.

The foregoing third components described in connection with the separation of HD may also be employed in the separation of oxygen isotopes or nitrogen isotopes by selective adsorption of $O_2$ or $N_2$.

Lithium isotopes may be separated by the selective adsorption of volatilizable lithium compounds such as lithium amide, lithium methyl, lithium ethyl, lithium acetylsalicylate ($LiC_9H_7O_4$) and the like. The separation of these isotopes may be improved by conducting the adsorption and/or rectification in the presence of hydrocarbons, chlorinated hydrocarbons, amines and the like which boil somewhat closely to the aforementioned lithium compounds.

Likewise the separation of $U^{234}F_6$, $U^{235}F_6$ and $U^{238}F_6$ from each other may be improved by the addition of such compounds as arsenic pentafluoride, antimony pentafluoride, boron trifluoride, phosphorus pentafluoride, carbon tetrafluoride, silicon tetrafluoride, sulfur hexafluoride and other such volatile fluorinated compounds.

While normally only a single third component is employed in a given separation, it is apparent that two or more such third components may be employed simultaneously.

Referring now more particularly to Figure 4, which shows one modification for carrying out adsorption and rectification in the presence of an added third component, an isotopic mixture such as ordinary water is introduced through line 240 and is vaporized in interchanger 241 whence it flows to feed engaging zone 242 of selective adsorption column 243.

The added third component which is dioxane, for example, is introduced from line 244 into third component engaging zone 245 which is below feed engaging zone 242. Dioxane passes upwardly through stripping zone 246 and rectification zone 247 and comes in contact with the feed stock in feed stock engaging zone 242. Dioxane and $H_2O$ and HDO pass upwardly through adsorption zone 248 wherein the HDO and minor amounts of $D_2O$ are selectively adsorbed. In adsorption zone 248 the presence of the dioxane increases the volatility of $H_2O$ relative to HDO and $D_2O$ with the result that it is more readily removable therefrom. The volatility of HDO relative to $D_2O$ is similarly increased.

The bulk of the $H_2O$ is removed from product disengaging zone 249 through line 250 and is partially contaminated with dioxane. The somewhat more volatile dioxane flows upwardly through third component stripping zone 251 which serves to separate in part $H_2O$ from dioxane. Dioxane from third component stripping zone 251 is withdrawn from dioxane disengaging zone 252 through line 253 whence it passes through interchanger 254 and blower 255 for recycle to dioxane engaging zone 245.

The dioxane stripping zone 251 is supplied with fresh cooled adsorbent from cooling zone 256 in the manner analogous to that described for previous selective adsorption columns. The downward flow of adsorbent from stripping zone 251 carries minor amounts of $H_2O$ downwardly into adsorption zone 248 wherein it is preferentially desorbed by rich reflux gas and removed through line 250. HDO and $D_2O$ on the adsorbent in adsorption zone 248 flows downwardly into rectification zone 247 wherein deuterium shift is effected by means of isotope exchange with the production of less readily adsorbable protium oxide which passes upwardly through the column. The adsorption and readsorption of protium oxide and deuterium oxide in rectification zone 247 is enhanced by the presence of the upwardly flowing dioxane stream. Rectified adsorbent containing substantially pure deuterium oxide passes to stripping zone 246 wherein the hot dioxane causes the desorption of the deuterium oxide which is withdrawn through line 257 from product disengaging zone 258. Adsorbent below stripping zone 246 contains dioxane and this adsorbent passes through heating zone 259 wherein the bulk of the dioxane is removed by thermal desorption. The adsorbent from heating zone 259 is reconveyed to the top of column 243 by any suitable lifting means.

The protium oxide withdrawn in line 250 contains some dioxane which must be recovered for recycling. Such removal in the modification shown is effected by distillation in distillation column 260 and the relatively pure protium oxide is withdrawn from the bottom through line 261. The overhead distillate from column 260 contains protium oxide by virtue of the existence of a dioxane-water azetrope. Such water is preferably removed prior to recycling or alternatively the distillation may be conducted in the presence of benzene or the like to break the azeotrope. Alternatively the stream may be returned to the column 243 such as with the feed or in the proximity of disengaging zone 249. Similarly the deuterium oxide-dioxane mixture in line 257 is rectified in column 262 and the product is produced from line 263.

In the foregoing description of Figure 4 trimethyl amine, diethyl ether, or benzene may be substituted for the dioxane for example.

It is apparent that other methods for the purification of the products and the removal of the third component therefrom may be employed. Thus either dioxane-protium oxide or dioxane-deuterium oxide mixtures may be separated by drying over calcium chloride, magnesium sulfate and the like. In general third components may be separated by distillation, azeotropic distillation, solvent extraction, adsorption or by cooling the mixture and the separation of the two liquid phases where such conditions prevail as in the case of the use of benzene as the third component during the resolution of water.

In the modification of the invention described in Figure 4, the third component was less readily adsorbable than the two species of the compound being separated. In the event that the third component is more readily adsorbable, the third component is withdrawn at a low point in the column such as from the location of zone 245 and is recycled to a point near the upper part of the column such as zone 252.

In other modifications of the invention the third component may be recycled so as to flow though portions of either the adsorption and/or rectification zones while not flowing through other portions of such zones.

In other modifications of the invention the third component may be separated from one or both product streams by means of selective adsorption such as in either Figures 5 or 6.

Referring now more particularly to Figure 5 a feed stock containing a mixture of isotopic species, e. g. steam, is introduced through line 270 whence it flows to feed engaging zone 271 of selective adsorption column 272. In the particular modification the third component, which is less readily adsorbable than any of the feed stock isotopic species enters the lower portion of the column via line 273 whence it flows to third component engaging zone 274. For example in the separation of steam the third component is 2-methyl furan.

The third component flows upwardly through zones 285 and 284 and is mixed with the feed stock. The mixture then flows upwardly through adsorption zone 275 countercurrent to the adsorbent wherein the selective adsorption of the heavier isotope takes place. The effect of the third component again alters the relative volatility of the two components of the isotopic mixture so as to favor increased separation. The third component and lighter isotope pass upwardly through stripping zone 276 wherein the relatively more readily adsorbable isotope, relative to the third component, i. e. the less readily adsorbable isotope relative to the other isotope, is adsorbed on the downwardly flowing adsorbent, a portion of which is withdrawn through transfer line 277. Product disengaging zone 278 and heating zone 279 are located in transfer line 277. The adsorbent flowing therethrough is heated in heating zone 279 which desorbs the adsorbed constituents thereon and the product is withdrawn from disengaging zone 278 via line 280. The high concentration of the lighter isotope above disengaging zone 278 causes the preferential desorption and consequent rectification of any less readily adsorbable third component entering line 277 with the adsorbent and returns such component to the main part of the column in stripping zone 276.

Third component which is unadsorbed in stripping zone 276 passes upwardly to third component disengaging zone 281 and is removed via line 282 and blower 283 whence it flows through line 273 to third component engaging zone 274 previously described.

The adsorbed heavier isotope on the adsorbent flows downwardly from adsorption zone 275 into rectification zone 284 and thence into stripping zone 285. In rectification zone 284 isotope exchange and preferential adsorption of reflux gas cause the lighter isotope to be preferentially desorbed and pass upwardly while the heavier isotope remains in an adsorbed state. The rectification in rectification zone 284 is enhanced by the presence of a third component.

A portion of the rectified adsorbent containing the heavier isotope and small amounts of a third component is withdrawn through line 286, product disengaging zone 287 and heating zone 288. In a manner similar to that described in connection with the lighter product the adsorbent is stripped of adsorbed material by passage through heating zone 288 and further rectification occurs above product disengaging zone 287 as a result of rising reflux gas rich in the heavier isotope which causes preferential desorption of the third component and causes it to be returned to the column by passage upwardly through line 286. The heavier isotope is removed through line 289.

In stripping zone 285 the third component assists in the stripping of the heavier isotope from the adsorbent and the adsorbent containing adsorbed third component passes through stripping zone 290 and heating zone 291. The heating of the adsorbent completes the desorption of the third component and causes it to pass upwardly through the column. Adsorbent below heating zone 291 is withdrawn through line 292 and is conveyed to vessel 293 by suitable means whence it flows through line 294 into the top of column 272. Adsorbent at the top of the column passes through cooling zone 295 prior to entering stripping zone 276.

It is apparent from the foregoing description that an isotopic mixture entering line 270 is separated into two fractions of different isotopic species which are discharged in substantially pure form and free of any third component through respective product discharge lines 280 and 289. Where additional isotopes are present to be separated the simultaneous separation of three or more may be carried out in a similar column by increasing the length of the column and by adding additional lines for withdrawing product through product disengaging zones and heating zones.

Referring now more particularly to Figure 6, which shows a modification wherein the third component is relatively more adsorbable than the compound to be separated, the feed stock is introduced through line 300 whence it enters feed engaging zone 301 of selective adsorption column 302. The third component is introduced from line 303 into third component engaging zone 304 whence it is adsorbed and flows downwardly through adsorption zone 305 on the absorbent countercurrent to the upwardly flowing compound to be separated. The presence of the third component alters the relative adsorbability of the several isotopic species permitting a separation of the isotopic species. The relatively lighter isotope passes upwardly through line 306 countercurrent to a descending adsorbent stream and enters product disengaging zone 307. The countercurrent flow of the lighter isotope removes traces of the third component entering line 306 so that a relatively pure lighter isotope containing species is withdrawn through discharge line 308.

The adsorbed heavier isotope and third component pass downwardly through rectification zone 309 wherein isotope exchange and preferential desorption of the lighter isotope takes place. Rectified adsorbent from rectification zone 309, substantially free of the lighter isotope, passes downwardly through stripping zone 310 and heating zone 311 which causes desorption of the third component which is removed through third component disengaging zone 312 via line 313. The hot rising vapors of a third component above third component disengaging zone 312 causes preferential desorption of the heavier isotope vapors, part of which enter zone 309 as reflux and part enter the lower open end of line 314 and pass upwardly countercurrently to fresh adsorbent to product disengaging zone 315 whence they are discharged through line 316. The descending adsorbent in line 314 causes selective adsorption of any third component and returns it to the main part of the column leaving the heavier isotope substantially unadsorbed.

The third component desorbed in zone 311 is removed via line 313 and passes through blower 313a and is returned via line 303 to the top of the column. Stripped adsorbent from heating zone 311 is withdrawn through line 317 and is conveyed by suitable means to the top of the selective adsorption column 302 whence it enters through line 318. Adsorbent in line 318 is cooled in cooling zone 319 and thereafter passes to adsorption zone 305. A part of the stripped adsorbent in line 317 is supplied to coolers 306a and 314a of lines 306 and 314 respectively.

It is apparent from the foregoing discussion of Figure 6 that an isotopic mixture introduced in line 300 is discharged through product discharge lines 308 and 316 in highly purified form and free of any added third component where such third component is present for the purpose of increasing the difference between the adsorbability of the two isotopic species.

Where steam is employed as the feed stock in Figure 6, the third component is nitroethane or toluene for example.

It is apparent that in the modification of Figure 6 three or more isotopes may be separated by increasing the number of product disengaging zones.

Usually the flow rate of the third component is less than the flow rate of the feed in order to prevent disruption of adsorption and rectification zones by excessive stripping. Generally the flow rate of the third component varies between about 0.001 and 1.0 times the flow rate of the feed to the column.

The adsorbent employed in the process of this invention is generally an adsorptive oxide such as silica, alumina, zirconia, thoria, magnesia, magnesium hydroxide and the like. In certain cases adsorptive sulfides and other compounds of inorganic character may be employed. Alternatively activated carbon, such as animal or vegetable charcoal or the like may be employed.

In the selective adsorption of isotopes wherein the element whose species is being separated exists as a monoatomic molecule or wherein such element constitutes a single atom in a polyatomic molecule (and the recovery of a single isotope only is desired) catalysts to promote isotope exchange are unnecessary. However, where either a homo-molecular or hetero-molecular isotope exchange is a necessary part of the process, as where the element to be resolved makes up two or more atoms of a polyatomic molecule, a catalyst for the isotope exchange is necessary. In certain cases ordinary adsorptive oxides and sulfides and charcoal are mild catalysts of themeselves and may be employed for isotope exchange of hydrogen atoms in relatively polar molecules such as water, hydrochloric acid, hydrogen sulfide and the like.

In general it is preferable to employ isotope exchange catalysts. For this purpose the adsorbent usually includes the oxides, sulfides, or other compounds of heavier metals of greater than atomic number 21, such as chromium, molbdenum, cobalt, nickel, zinc, iron, lead, beryllium, cadmium, vanadium, manganese, tantalum, tungsten, titanium, osium, iridium, platinum, palladium, rhodium, silver, columbium, scandium, thorium, aluminum, uranium, zirconium, tin, cadmium, tungsten, cerium, copper, etc., or combinations of two or more of such compounds.

Of these catalytic agents those which appear to be most effective and consequently find the greatest usage are the compounds of the heavy metals of atomic No. 22 to 42 including titanium, vanadium, chromium, manganese, iron, cobalt, nickel, copper, zinc, yttrium, zirconium, columbium and molybdenum. The oxides of molybdenum, and of cobalt in the presence of molybdenum, have been found to be the very good catalytic agents for the isotope exchange process of this invention.

The catalyst and adsorbent may be employed as mechanical mixtures or alternatively the catalyst may be supported on an adsorbent such as by coprecipitation, coimpregnation and the like. Supported catalysts will generally contain between about 0.1% and 20% by weight of the catalytic metal oxide or sulfide.

The preferred catalyst carrier and/or adsorbent for the surption of isotopic compounds is adsorptive silica and silica containing minor proportions of other oxides such as alumina, magnesia, and the like. Such silicas may be prepared synthetically by precipitation or co-precipitation or they may be prepared by acid treating or other treatment of naturally occurring clays. Commercially available cracking catalysts are predominantly silica in composition and may be employed for isotopic selective adsorption processes of this invention. A particularly desirable commercially available cracking clay is acid-treated montmoorillonite clay and this has been found to be highly suited to isotopic exchange.

It has been found that the greatest difference in the selective absorbability of two isotopes occurs in the vicinity of the atmospheric pressure boiling point of the compound to be resolved. It is therefore preferable that the adsorption be carried out at temperatures which are preferably within the range of 100° F. above the normal boiling point. Still better results are obtained when the adsorption temperature is not less than nor greater than 50° F. above or below the normal boiling point of the compound and preferably when the adsorption temperature is below the temperature of the normal boiling point.

The adsorption may be carried out at any suitable pressure such as between 0.1 and 100 atmospheres.

In the isotopic fractionation of a number of molecules the reaction rate of the homo-molecular isotope exchange is relatively slow or is sometimes even negligible under appropriate conditions of selective adsorption. Molecules containing a single elemental species of atoms are particularly subject to this difficulty such as $H_2$, $N_2$, $O_2$, $Cl_2$, $Br_2$, and the like. Other molecules such as $NH_3$, $CH_4$, $C_2H_6$ and the like, also have relatively slow homo-molecular and hetero-molecular isotope exchange reaction rates.

In the case of the foregoing compounds, as with other compounds in general, the optimum selective adsorption temperatures are close to the boiling point of the compound to be separated at atmospheric pressure.

At the temperatures near the boiling point however, the isotype exchange reactions are very slow and certain molecules such as $N_2$ are exchangeable only at higher temperatures such as 400° F. and more. In the separation of such compounds it is therefore desirable to recover a partially enriched isotope fraction in a selective adsorption column and to withdraw the enriched fraction and effect the isotope exchange in a suitable catalytic zone and thereafter separate the desired isotope from the catalytic effluent by suitable means which is preferably by selective adsorption. Figures 7, 8 and 9 relate to processes for effecting external isotope exchange.

Referring now more particularly to Figure 7, molecular nitrogen gas, such as ordinary nitrogen, is introduced through line 360 into feed engaging zone 361 of selective adsorption column 362. Ordinary nitrogen contains only 0.38% of $N^{15}$ atoms and therefore its molecular make-up is predominantly $N_2^{14}$ with minor amounts of $N^{14}N^{15}$ and traces of $N_2^{15}$. Cooled adsorbent from cooling zone 363 flows downwardly and countercurrently through adsorption zone 364 and selectively adsorbs the $N^{14}N^{15}$ and the $N_2^{15}$. The unadsorbed $N_2^{14}$ is discharged through line 365 to product storage not shown.

Adsorbent containing adsorbed heavier isotopes and small amounts of the lighter isotopes passes downwardly through first rectification zone 366 wherein such small amounts are preferentially desorbed and on through second rectification zone 367 into desorption zone 368 immediately above heating zone 369. Adsorbent passing through heating zone 369 is desorbed of substantially all nitrogen gas which is withdrawn from the top of desorption zone 368 for recycle of the adsorbent to the top of the column. In rectification zones 366 and 367 adsorbed $N_2^{14}$ is preferentially desorbed and passes upwardly through the column to adsorption zone 364. Relatively pure $N^{14}N^{15}$ and minor amounts of $N_2^{15}$ are discharged through line 370.

Nitrogen flowing in line 370 passes through heat exchanger 371 and thence through isotope exchange reaction zone within catalytic reactor 372 wherein the following reaction takes place to form or approximate an equilibrium mixture:

$$2N^{14}N^{15} \rightarrow N_2^{14} + N_2^{15}$$ 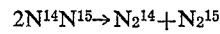

Effluent from reactor 372 passes through interchanger 373 and thence to feed engaging zone 374 of column 375. In column 375 descending adsorbent passes from cooling zone 376 through first adsorption zone 377, second adsorption zone 378, rectification zone 379, desorption zone 380 and heating zone 381 wherefrom it is discharged for conveyance to the top of the column. In adsorption zone 378, $N_2^{15}$ is selectively adsorbed and passes downwardly to rectification zone 379 wherein upwardly flowing reflux gases rich in $N_2^{15}$ selectively desorb small amounts of $N^{14}N^{15}$ and $N_2^{14}$ also adsorbed in zone 378. In desorption zone 380 hot desorbed gases from heating zone 381 desorb $N_2^{15}$ which is partly employed as reflux and partly discharged from line 382 to product storage not shown.

In first adsorption zone 377 and second adsorption zone 378 a partial separation of $N_2^{14}$ and $N^{14}N^{15}$ is effected. A stream relatively rich in $N^{14}N^{15}$ is discharged through line 383 which passes through blower 384 and interchanger 385 for recycle through catalytic isotope exchange reaction zone with reactor 372. The fraction relatively rich in $N_2^{14}$ is substantially unadsorbed and is discharged through line 386 and blower 387 whence it flows through line 388 to recycle engaging zone 389 of column 362. In column 362 the separation of $N_2^{14}$ from $N^{14}N^{15}$ is completed in the manner described hereinbefore and the $N^{14}N^{15}$ is again recycled through line 370, interchanger 371 to isotope exchange reactor 372. It is apparent from the foregoing description of Figure 7 that ordinary nitrogen may be separated into substantially pure $N_2^{14}$ and $N_2^{15}$. Moreover the adsorptive separation may be conducted at low temperatures such as −300° F. while the isotope exchange may be conducted at relatively high temperature such as 400° F. to 1200° F.

Referring now more particularly to Figure 8, ordinary nitrogen gas is introduced through line 390 into selective adsorption column 391 wherein cooled adsorbent flowing through adsorption zone 392 selectively adsorbs $N^{14}N^{15}$ and any traces of $N_2^{15}$. Unadsorbed $N_2^{14}$ is discharged through line 393. Adsorbent from adsorption zone 392 passes downwardly through a series of rectification zones 393a, 394, 395, 396 and 397 in each of which a successively more readily adsorbable reflux gas is employed. The adsorbent flows therefrom to desorption zone 398 which is heated from below by a heating zone not shown to produce reflux gas and product gas analogous to zones 369 and 381 shown in Figure 7. At vertical intervals gas is withdrawn from a disengaging zone passed through an interchanger and an isotope exchange catalyst zone and returned to the column somewhat below (or above) the point of withdrawal. Thus gas withdrawn from above rectification zone 394 passes through blower 399, interchanger 400, catalytic zone 401, interchanger 402 whence it is returned to an engaging zone below rectification zone 394. Similarly gas withdrawn above rectification zone 396 passes through catalytic zone 403 and is returned somewhat below rectification zone 396. In each case the following reaction is carried toward equilibrium:

$$2N^{14}N^{15} \rightarrow N_2^{14} + N_2^{15}$$ 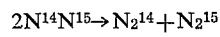

Within the column the $N_2^{14}$ formed during equilibration passes upwardly through the several rectification zones and is withdrawn through line 393. $N^{14}N^{15}$ remains in the several rectification zones until it is finally exchanged to form a molecule each of light and heavy nitrogen. $N_2^{15}$ is produced through line 404 to product storage not shown.

It is apparent that the apparatus of Figure 8 permits selective adsorption of nitrogen at low temperatures and isotope exchange at high temperatures in accordance with optimum operating conditions.

Referring now more particularly to Figure 9, ordinary hydrogen is introduced through line 405 to selective adsorption column 406. Ordinary hydrogen is principally $H_2^1$ with minor amounts of $H^1H^2$ and traces of $H_2^2$.

Unadsorbed $H_2^1$ is discharged from above selective adsorption zone 407 through line 408. Adsorbent containing $H^1H^2$ and traces of $H_2^2$ pass downwardly through rectification zone 409 wherein the adsorbent stream divides, a portion passing through disengaging zone 410 to the one side of partition 411 and the other passing to the other side of partition 411 through engaging zone 412. Hydrogen gas is withdrawn from disengaging zone 410 through line 413 whence it passes through blower 414, interchanger 415 and isotope exchange catalytic zone 416. In catalytic exchange zone 416 the following reaction approaches equilibrium:

$$2H^1H^2 \rightarrow H_2^1 + H_2^2$$

The equilibrium mixture enriched in $H_2^2$ passes through interchanger 417 and is returned to engaging zone 412. From engaging zone 412 $H_2^1$ passes upwardly substantially unadsorbed and $H_2^2$ passes downwardly substantially completely adsorbed, while $H^1H^2$ passes both upwardly and downwardly.

Below partition 411 the divided adsorbent streams are rejoined and flow through desorption zone 418 wherein $H_2^2$ is desorbed and withdrawn through line 419.

The use of partition 411 prevents immediate recycling of the isotope exchange effluent to the isotope exchange feed line 413. Furthermore the isotope exchange feed is substantially free of $H_2^1$ which would adversely affect the equilibrium desired in isotope exchange zone 416. Unconverted $H^1H^2$ eventually is passed to the top of partition 411 or is carried to the bottom of partition 411 and enters disengaging zone 410 for appropriate recycle for isotope exchange.

It is apparent that partition 411 may be replaced by any suitable apparatus for dividing the adsorbent stream into two portions. Thus partition 411 may be replaced with a centrally positioned tube open at both ends which encloses disengaging zone 410 and is surrounded by engaging zone 412. Alternatively, the tubular replacement may enclose engaging zone 412 and be surrounded by disengaging zone 410.

While the use of isotope exchange is mandatory for the recovery of substantially pure light and substantially pure heavy isotopes where the compound contains two or more atoms of the element to be separated such isotope exchange is also advantageous in polyatomic molecules containing a single atom of the isotope species to be recovered. The increased molecular weight due to continued isotope exchange favorably increases the molecular weight difference between the desired heavy isotope and the desired light isotope on the average in their compounds. Thus in the recovery of $O^{17}$ and/or $O^{18}$ by selective adsorption of water vapor, continued isotope exchange causes the desired isotope to be selectively combined with increased amounts of deuterium with which it is more readily separable from $H_2^1O^{16}$ than when present in the form $H_2^1O^{17}$ or $H_2^1O^{18}$.

Perhaps the process of this invention can best be understood by reference to the following specific examples:

*Example I*

The hydrogen of ordinary water contains about 0.02% deuterium atoms and 99.98% protium atoms. Ordinary water is vaporized and passed countercurrently under conditions of selective adsorption against a vegetable charcoal impregnated with about 0.5% by weight of $CoO \cdot MoO_3$. About 1500 lbs./hr. of adsorbent is circulated against about 1000 std. cu. ft./hr. of steam. The temperature in the adsorption zone is maintained at about 220° F. and the pressure is about 1.0 atmosphere. The rectification zone is maintained at a somewhat higher temperature and substantially the same pressure. Unadsorbed gas is withdrawn from the column so as to maintain a constant pressure within the column while a lower product gas is withdrawn at a flow rate of about 0.5 std. cut. ft./hr. Under these conditions a bottoms product is produced which contains about 99% $D_2^4O$ and the product passing overhead contains about 0.0005 volume percent of deuterium as DOH.

*Example II*

When Example I is repeated using a commercially available silica gel containing about 2% by weight of NiO impregnated thereon, substantially the same results are obtained.

*Example III*

When Example I is repeated with the exception that about 10 std. cu. ft. of vaporized dioxane is introduced below the rectification zone, it is found that only about 1100 lbs./hr. of adsorbent produces substantially the same separation as in Example I. The dioxane is passed through both the rectification and the adsorption zones.

From the foregoing description and examples of this invention it is apparent that isotopes of many elements may be separated by the process of this invention. For example the following separations can be made: $H^1$ from $H^2$, $Li^6$ from $Li^7$, $B^{10}$ from $B^{11}$, $C^{12}$ from $C^{13}$, $N^{14}$ from $N^{15}$, and $O^{16}$ from $O^{17}$ from $O^{18}$. While the foregoing isotopes are naturally occurring isotopes, it is also apparent that radioactive isotopes may be separated in substantially the same manner as that described for non-radioactive isotopes.

It is required to have a volatile compound for separation of isotopes by selective adsorption. The following tabulation shows volatile compounds which can be employed for isotope enrichment of several elements.

S____ $SO_2$, $SO_3$, $H_2S$
N____ $N_2$, $NH_3$, NO, $NO_2$ HCN
H____ $H_2$, $H_2O$, $H_2S$, $H_3N$, $H_2Se$, HF, $H_3P$, $H_4Si$, HCN
O____ $O_2$, $H_2O$, $SO_2$, $CO_2$, CO, NO, $NO_2$
Li____ $LiNH_2$, $LiCH_3$, $LiC_2H_5$, $LiC_9H_7O_4$
B____ $BF_3$
C____ CO, $CO_2$, $CS_2$ COS, HCN, $Al(CH_3)_3$
Cl___ $Cl_2$, HCl
Si___ $SiH_4$, $CH_3SiH_3$, $SiF_4$, $SiCl_4$
Zn___ $Zn(CH_3)_2$, $Zn(C_2H_5)_2$
Br___ HBr, $Br_2$
Se___ $H_2Se$
Te___ $H_2Te$
U____ $UF_6$

In addition to the foregoing volatile compounds, many metals form volatile organic compounds such as acetylacetonates, dimethyl glyoxime derivatives and the like. The organic portion may itself be subjected to selective adsorption to produce a compound of a single mass, or alternatively "radical fractionation" may be carried out simultaneously with the fractionation of the metal isotope.

The control of product purity within an adsorption column may be followed by temperature differences, gas density differences, thermal conductivity differences and the like which occur throughout the adsorption column. In the preferred method, thermal conductivity is employed as a means for the continuous analysis of the isotopes and isotope mixtures. One modification of a differential thermal conductivity control method is shown in Figure 10 and Figure 11.

Referring now more particularly to Figures 10 and 11, Figure 10 shows a selective adsorption column 325 with feed line 326 and product lines 327 and 328 wherein the withdrawal of product in line 328 is controlled by motor valve 329. Two thermal conductivity measuring points are located within the column at 330 and 331 which are controlled by instrument 332 which in turn controls the operation of motor valve 329.

In Figure 11 there is shown a Wheatstone bridge type circuit, wherein current passes through thermal conductivity coils 330a and 331a. Fluctuations of the difference between the thermal conductivities of the gases surrounding coils 330a and 331a cause fluctuations of galvanometer 333. The variations of galvanometer 333 are in turn employed to control the operation of motor valve 329.

In operation variable resistances 334 and 335 are set to maintain balance when gases of two different thermal conductivities surround coils 330a and 331a. Variations of isotope content, which in turn produce variations of thermal conductivity, are reflected by variations of the position of galvanometer 333 which in turn opens or closes motor valve 329 to maintain a given isotope concentration difference between the two gases. The use of this control technique may also be employed in selective adsorption processes of other gases than isotope mixtures such as mixtures of hydrocarbon gases, for example. Similar controls may be employed to discharge the less readily adsorbed product or to admit the feed stock.

The methods of this invention may also be applied to liquid phase systems as well as to gas phase systems. The contacting efficiency is considerably higher in the case of vapors and the vapor phase system is therefore much the preferred modification.

Where molecular hydrogen is separated in the processes of this invention, the protium ($H_2^1$) obtained thereby may be employed for hydrogenation of hydrocarbon stocks. During such hydrogenation the protium will come to an equilibrium by pickup of deuterium from the stocks being hydrogenated. Effluent hydrogen from the hydrogenation zone can then be reprocessed to recover the deuterium pickup. By the use of this process hydrogen is employed to hydrogenate oil and byproduct deuterium is produced from the hydrogen source and by dedeuteration of the oils being hydrogenated. During isotope enrichment the recycle hydrogen stream can be simultaneously freed of contaminants such as methane, ethane, hydrogen sulfide and the like by selective adsorption. A partial enrichment of the isotopic feed stock is obtained by hydrogenation of oils since protium, in preference to deuterium, hydrogenates the oil because of a faster reaction rate.

In one modification of the invention tritium or tritium oxide may be added to the selective adsorption column to follow the fractionation of the deuterium or deuterium oxide. The distribution of tritium, as measured by suitable radiation measuring apparatus may then be employed to control adsorbent flow rates and/or product withdrawal rates and indirectly control product quality thereby.

It is apparent that the apparatus may be modified in many ways to accomplish the same process of this invention. Thus adsorbent is passed successively through a cooling zone, an adsorption zone, a rectification zone and a heating zone. The conveyance of solids from the bottom of the column to the top may take place anywhere in this sequence so long as the cyclical order thereof is not disturbed and suitable provision is made for counterflow of rich gas reflux.

The general process of this invention, including that of the use of third components, may also be used in the separation of metals and in the separation of isotopes of metals by selective adsorption of their volatile compounds such as their halides, particularly metal fluorides or chlorides. Thus zirconium and hafnium may be separated by selective adsorption of their tetrachlorides since hafnium tetrachloride is the more readily adsorbable. Molybdenum, tungsten and uranium may be separated by selective adsorption of their fluorides. Of these three metal halides tungsten is the least readily adsorbable and uranium is the most readily adsorbable. Third components such as inorganic or organic halides may be employed as third components in the separation of metal halides. Selective adsorption may similarly be employed to separate volatile compounds of rare earth metals or other metal such as by selective adsorption of their acetylacetonates. Iron chloride may be separated by selective adsorption from the titanium chloride vapors produced by chlorination of titanium ore.

The foregoing disclosure of this invention is not to be considered as limiting since many variations may be made by those skilled in the art without departing from the spirit or scope of the following claims.

I claim:

1. A process for the separation of an element into at least two of its isotopic modifications, a heavy isotope and a lighter isotope, which comprises contacting a chemically homogeneous feed gas, each molecule of which contains a plurality of atoms of said element, with a moving bed of solid granular adsorbent, thereby forming a rich adsorbent containing an adsorbate phase relatively rich in molecules of said gas which contain at least one atom of said heavy isotope, subjecting said adsorbate to catalytic isotope exchange in the presence of an isotope exchange catalyst, whereby the proportion of gas molecules in said adsorbate which contain more than one atom of said heavy isotope is increased, contacting said rich adsorbent with a rich gas reflux consisting of desorbed, isotope-exchanged adsorbate from said rich adsorbent to selectively displace molecules of said gas containing less than two atoms of said heavy isotope, thereby forming a rectified adsorbent rich in molecules of said gas containing more than one atom of said heavy isotope, and desorbing said last molecules from said adsorbent.

2. A process according to claim 1 wherein said isotope exchange is effected by (1) including with said adsorbent an isotope exchange catalyst and (2) subjecting said rich adsorbent to rectification conditions in the presence of said rich gas reflux.

3. A process according to claim 1 wherein said isotope exchange is effected by (1) including with said adsorbent an isotope exchange catalyst and (2) subjecting said rich adsorbent to rectification conditions in the presence of said rich gas reflux and a second, less readily adsorbable, molecular species of gas rich in atoms of said heavy isotope.

4. A process according to claim 1 wherein said isotope exchange is effected by desorbing at least a part of said adsorbate from the rich adsorbent, passing said desorbed gas into a separate isotope exchange zone maintained at a high temperature and containing an isotope exchange catalyst, whereby homo-molecular isotope exchange is effected, and subjecting the effluent gases from said isotope exchange zone to further rectification by contact with said adsorbent in said rectification zone.

5. A process for separating isotopes by selective adsorption on solid adsorbents which comprises flowing a substantially compact bed of granular, inorganic, adsorbent material downwardly in the order named through a cooling zone, an adsorption zone, a rectification zone, a desorption zone, a heating zone, and back to said cooling zone, contacting a chemically homomolecular, isotopically heteromolecular feed gas countercurrently with said adsorbent in said adsorption zone at a temperature not greater than about 100° F. above the atmospheric boiling point of said feed gas, thereby selectively adsorbing isotopically heavier molecules of said gas and forming a rich adsorbent and a lean gas, removing said lean gas from the top of said adsorption zone, heating said rich adsorbent in said heating zone to a temperature sufficiently high to desorb the adsorbed rich gas phase, flowing the major portion of said desorbed rich gas upwardly as reflux through said desorption and rectification zones thereby effecting rectification therein, and withdrawing a minor portion of said desorbed rich gas from said desorption zone, said minor portion of rich gas constituting a product stream substantially enriched in isotopically heavy molecules.

6. A process as defined in claim 5 wherein said rectification is effected at least in part in the presence of an isotope exchange catalyst selected from the group consisting of metals of atomic number above 21 and their oxides and sulfides, whereby both isotope-exchange rectification and molecular adsorption-desorption rectification is obtained.

7. A process as defined in claim 6 wherein said isotope-exchange rectification is obtained in said rectification zone by including said catalyst in said adsorbent.

8. A process as defined in claim 6 wherein said isotope-exchange rectification is obtained in said rectification zone by including said catalyst with said adsorbent, and is further promoted by introducing an extraneous gas at an intermediate point in said rectification zone which gas is chemically different from and less readily adsorbable than said feed gas, and which is richer per unit volume in atoms of the desired heavy isotope than is the reflux-gas at the said intermediate point of introduction.

9. A process as defined in claim 6 wherein said isotope-exchange rectification is obtained by removing a portion of gases from an intermediate section of said rectification zone, passing them through a catalytic isotope exchange zone containing said catalyst, and maintained at a temperature between about 400° F. and 1200° F., cooling the treated gases and subjecting them to further molecular adsorption-desorption rectification by contact with said adsorbent.

10. A process as defined in claim 6 wherein said feed gas is hydrogen cyanide.

11. A process for separating isotopes by selective adsorption on solid adsorbents which comprises flowing a substantially compact bed of granular, inorganic, adsorbent material downwardly in the order named through a cooling zone, an adsorption zone, a rectification zone, a desorption zone, a heating zone, and back to said cooling zone, contacting a chemically homomolecular isotopically heteromolecular feed gas countercurrently with said adsorbent in said adsorption zone at a temperature not greater than about 100° F. above the atmospheric boiling point of said feed gas, thereby selectively adsorbing isotopically heavier molecules of said gas and forming a rich adsorbent and a lean gas, removing said lean gas from the top of said adsorption zone, heating said rich adsorbent in said heating zone to a temperature sufficiently high to desorb the adsorbed rich gas phase, flowing the major portion of said desorbed rich gas upwardly as reflux through said desorption and rectification zones thereby effecting rectification therein, maintaining in at least one of the two zones of the group adsorption zone and rectification zone a third chemical component boiling within about 150° F. of the boiling point of said feed gas, said third component increasing the relative adsorbability difference between the heavier and lighter components of said feed gas, and withdrawing a minor portion of said desorbed rich gas from said desorption zone, said minor portion of rich gas constituting a product stream substantially enriched in isotopically heavy molecules.

12. A process according to claim 11 wherein said third component is less readily adsorbable than said feed gas and said third component is passed countercurrent to the flow of solid granular adsorbent through the rectification zone and through the adsorption zone.

13. A process according to claim 11 wherein said third component is less readily adsorbable than said feed gas and includes the steps of passing said third component countercurrent to the flow of solid granular adsorbent through the rectification zone and through the adsorption zone, separating said third component from the less readily adsorbable components of said lean gas in a stripping zone and passing said third component from said stripping zone to said rectification zone.

14. A process according to claim 11 wherein said third component is more readily adsorbable than said fed gas and said third component is passed concurrent to the flow of solid granular adsorbent through the adsorption zone and through the rectification zone.

15. A process according to claim 11 wherein said third component is more readily adsorbable than said feed gas and includes the steps of passing said third component concurrent to the flow of solid granular adsorbent through the adsorption zone and through the rectification zone, separating said third component from the more readily adsorbable components of said rich gas in a stripping zone and passing said third component from said stripping zone to said adsorption zone.

16. A process according to claim 11 wherein said feed gas is water and said third component boils between about 137° F. and 287° F.

17. A process according to claim 11 wherein said feed gas is water and said third component is an ether boiling between about 137° and 287° F.

18. A process according to claim 11 wherein said feed gas is water and said third component is a thioether boiling between about 137° and 287° F.

19. A process according to claim 11 wherein said feed gas is water and said third component is an ester boiling between about 137° and 287° F.

20. A process for separating hydrogen isotopes by selective adsorption on solid adsorbents which comprises flowing a substantially compact bed of granular inorganic adsorbent material downwardly in the order named through a cooling zone, an adsorption zone, a rectification zone, a desorption zone, a heating zone and back to said cooling zone, contacting feed-gas hydrogen containing $H_2^1$, $H^1H^2$ and $H_2^2$ with said adsorbent in said adsorption zone at a temperature below about $-323°$ F. thereby selectively adsorbing $H^1H^2$ and $H_2^2$ and forming a rich adsorbent and leaving a lean gas containing a high proportion of $H_2^1$, removing said lean gas from the top of said adsorption zone, heating said rich adsorbent in said heating zone to a temperature sufficiently high to desorb the adsorbed rich gas phase, flowing the major portion of said rich gas upwardly as reflux through said desorption and rectification zones to effect molecular adsorption-desorption rectification therein, withdrawing a part of said reflux gas at an intermediate point in said rectification zone and passing it through a high temperature catalytic isotope-exchange zone containing a catalyst selected from the group consisting of metals of atomic number above 21 and their oxides and sulfides, thereby to increase the relative proportion of $H_2^2$ and $H_2^1$ molecules therein while decreasing the proportion of $H^1H^2$, cooling the resulting isotope-exchanged mixture and returning it to said rectification zone, and withdrawing a minor portion of said desorbed rich gas from said desorption zone, said minor portion of rich gas constituting a product stream substantially enriched in $H_2^2$ molecules.

21. A process for separating nitrogen isotopes by selective adsorption on solid adsorbents which comprises flowing a substantially compact bed of granular inorganic adsorbent material downwardly in the order named through a cooling zone, an adsorption zone, a rectification zone, a desorption zone, a heating zone and back to said cooling zone, contacting feed gas nitrogen containing $N_2^1$, $N^1N^2$ and $N_2^2$ with said adsorbent in said adsorption zone at a temperature below about $-220°$ F. thereby selectively adsorbing $N^1N^2$ and $N_2^2$ and forming a rich adsorbent and leaving a lean gas containing a high proportion of $N_2^1$, removing said lean gas from the top of said adsorption zone, heating said rich adsorbent in said heating zone to a temperature sufficiently high to desorb the adsorbed rich gas phase, flowing the major portion of said rich gas upwardly as reflux through said desorption and rectification zones to effect molecular adsorption-desorption rectification therein, withdrawing a part of said reflux gas at an intermediate point in said rectification zone and passing it through a high temperature catalytic isotope exchange zone containing a catalyst selected from the group consisting of metals of atomic number above 21 and their oxides and sulfides, thereby to increase the relative proportion of $N_2^2$ and $N_2^1$ molecules therein while decreasing the proportion of $N^1N^2$, cooling the resulting isotope-exchanged mixture and returning it to said rectification zone, and withdrawing a minor portion of said desorbed rich gas from said desorption zone, said minor portion of rich gas constituting a product stream substantially enriched in $N_2^2$ molecules.

22. A process for separating hydrogen isotopes of water by selective adsorption on solid adsorbents which comprises flowing a substantially compact bed of granular inorganic adsorbent material downwardly in the order named through a cooling zone, an adsorption zone, a rectification zone, a desorption zone, a heating zone, and back to said cooling zone, contacting water vapor feed gas containing $H_2^1O$, $H^1H^2O$, and $H_2^2O$ with said adsorbent in said adsorption zone at a temperature below about 312° F. thereby selectively adsorbing $H^1H^2O$ and $H_2^2O$ and forming a rich adsorbent and leaving a lean gas containing a high proportion of $H_2^1O$, removing said lean gas from the top of said adsorption zone, heating said rich adsorbent in said heating zone to a temperature sufficiently high to desorb the adsorbed rich gas phase, flowing the major portion of said rich gas upwardly as reflux through said desorption and rectification zones thereby effecting molecular adsorption-desorption rectification and isotope-exchange rectification therein, and withdrawing a minor portion of said desorbed rich gas from said desorption zone, said minor portion of rich gas constituting a product stream substantially enriched in $H_2^2O$ molecules.

23. A process as defined in claim 22 wherein said isotope-exchange rectification is effected by the catalytic activity of said adsorbent without the further addition of catalyst.

24. A process as defined in claim 22 wherein said isotope exchange rectification is promoted by admixing with said adsorbent a catalyst selected from the group consisting of metals having an atomic number above 21, and their oxides and sulfides.

25. A process as defined in claim 22 including the additional step of contacting hydrogen gas containing both $H^1$ and $H^2$ isotopes of hydrogen with said rich adsorbent in at least one of the zones from the group adsorption zone and rectification zone in the presence of an isotope exchange catalyst selected from the group consisting of metals of atomic number above 21 and their oxides and sulfides, thereby isotopically exchanging $H^2$ atoms of said hydrogen gas for $H^1$ atoms of said water vapor.

26. A process as defined in claim 22 including the additional step of electrolyzing at least a part of said product stream to produce a hydrogen gas containing $H^1$ and $H^2$ atoms in its molecules and contacting at least a part of said hydrogen gas with said adsorbent in at least one of the zones from the group adsorption zone and rectification zone in the presence of an isotope-exchange catalyst selected from the group consisting of metals of atomic number above 21 and their oxides and sulfides, to isotopically exchange $H^2$ atoms of said hydrogen gas for $H^1$ atoms of said water vapor, and further increasing the proportion of $H_2^2O$ molecules in the nonelectrolyzed fraction of said product stream.

27. A process as defined in claim 22 wherein said adsorbent is an inorganic oxide.

28. A process as defined in claim 22 wherein said adsorbent is activated charcoal.

29. A process as defined in claim 22 including the additional step of maintaining a third chemical component in at least one of the two zones of the group adsorption zone and rectification zone, said third component increasing the relative adsorbability differences between $H_2^1O$, $H^1H^2O$ and $H_2^2O$ and boiling between about 137° and 287° F.

30. A process as defined in claim 29 wherein said third component is an ether.

31. A process as defined in claim 29 wherein said third component is a thioether.

32. A process as defined in claim 29 wherein said third component is an ester.

33. A process as defined in claim 29 wherein said third component is dioxane.

References Cited in the file of this patent

UNITED STATES PATENTS

| Number | Name | Date |
|---|---|---|
| 2,037,685 | Holden | Apr. 14, 1936 |
| 2,156,851 | Hansgirg | May 2, 1939 |
| 2,204,072 | Dean | June 11, 1940 |
| 2,293,901 | Hutchinson | Aug. 25, 1942 |
| 2,306,610 | Barrer | Dec. 29, 1942 |
| 2,435,796 | Reid | Feb. 10, 1948 |
| 2,519,873 | Berg | Aug. 22, 1950 |
| 2,519,874 | Berg | Aug. 22, 1950 |
| 2,559,152 | Grosse | July 3, 1951 |
| 2,583,239 | Teter | Jan. 22, 1952 |

OTHER REFERENCES

Kirshenbaum et al.: Separation of the Nitrogen Isotopes by the Exchange Reaction between Ammonia and Solutions of Ammonium Nitrate, CA 41–6116a (1947).

Waldmann: The Theory of Isotope Separation by Exchange Reaction, CA 38–20′ (1944).

Berstein et al.: Countercurrent Gaseous Exchange Method for the Separation of Isotopes, CA 42–8079b (1948).

Taylor et al.: Concentration of $N^{15}$ in a Gaseous Exchange Column, CA 42–6638c (1948).

Berstein et al.: Enrichment of $C^{13}$ and $O^{18}$ by a countercurrent Gaseous Exchange Process Using Thermal Diffusion, CA 41–6465c (1947).

Barr: Heavy Water AECD–2871, Technical Information Div., ORE, Oak Ridge, Tennessee, 12 pages.